United States Patent
Shiratori

(10) Patent No.: US 6,668,355 B1
(45) Date of Patent: Dec. 23, 2003

(54) TEXT EDITING SYSTEM

(75) Inventor: Shigeo Shiratori, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/422,061

(22) Filed: Oct. 21, 1999

(30) Foreign Application Priority Data

Mar. 30, 1999 (JP) .......................................... 11-090196

(51) Int. Cl.⁷ ............................................. G06F 17/00
(52) U.S. Cl. ....................... 715/531; 715/530; 715/517; 715/519; 400/64
(58) Field of Search ................................ 715/517, 519, 715/530, 531, 521; 400/3, 15, 64; 345/467

(56) References Cited

U.S. PATENT DOCUMENTS

| | | | |
|---|---|---|---|
| 3,991,405 A | * 11/1976 | Boyd et al. | 715/519 |
| 4,298,290 A | * 11/1981 | Barnes et al. | 400/3 |
| 4,587,631 A | * 5/1986 | Nielsen et al. | 715/524 |
| 5,566,068 A | * 10/1996 | Comer et al. | 707/1 |

FOREIGN PATENT DOCUMENTS

JP    10-162004    6/1998

OTHER PUBLICATIONS

MicroPro International Corporation, WORDSTAR PROFESSIONAL Release 4 (1987).*
James O. Achugbue, On the Line Breaking Problem in Text Formatting, Proceedings of the ACM SIGPLAN Symposium on Text Manipulation (1981), pp. 117–122.*

* cited by examiner

Primary Examiner—Joseph H. Feild
Assistant Examiner—Charles Bieneman
(74) Attorney, Agent, or Firm—Staas & Halsey LLP

(57) ABSTRACT

The present invention relates to a text editing system with a line end line feed function and an indentation function. In particular, a line end position Pg is stored in advance in a line end position storage unit 1, a line feed code in text data are detected by a line feed code detection unit 2 at the time of a text editing process after a character is inserted in or deleted from text data written in a subsequent file 4, shifts the position of the line feed code to the line end position Pg if the position of the line feed code does not match the line end position Pg, and the end of a line in a document is set to the line end position Pg. If there is a prescribed number of blank codes at the head of a line, at the time of a text editing process after insertion or deletion, a body of text can be edited in such a way that there are prescribed blanks that are always located at the head of the line by shifting blank codes.

28 Claims, 23 Drawing Sheets

Figure 5:
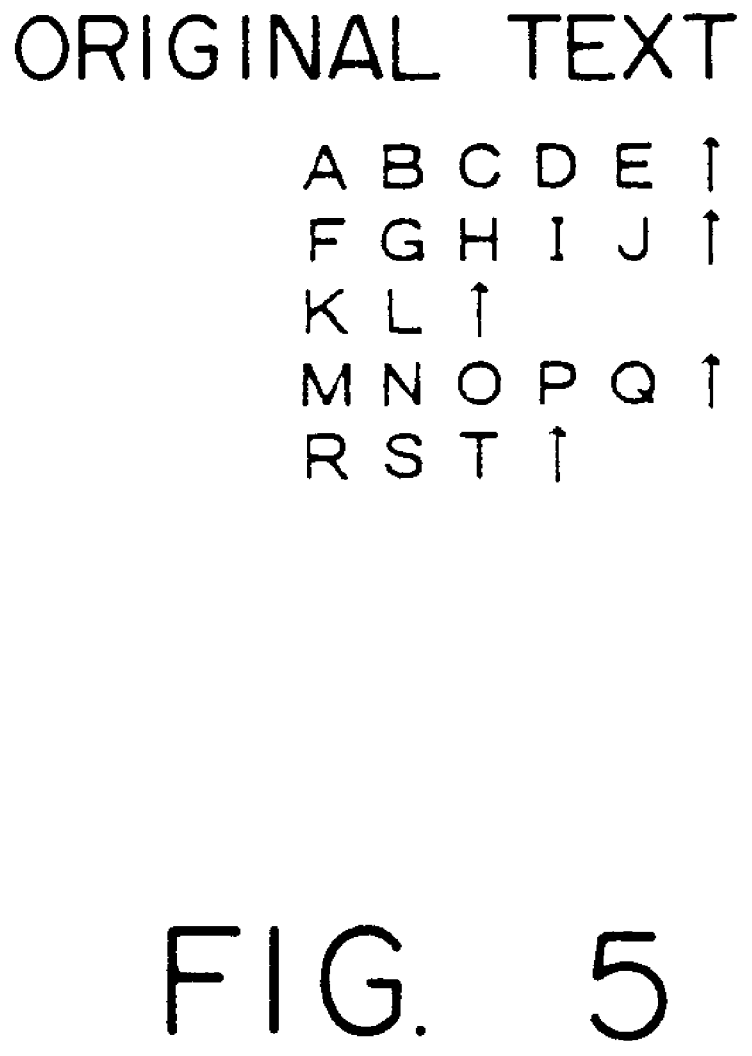

ORIGINAL TEXT

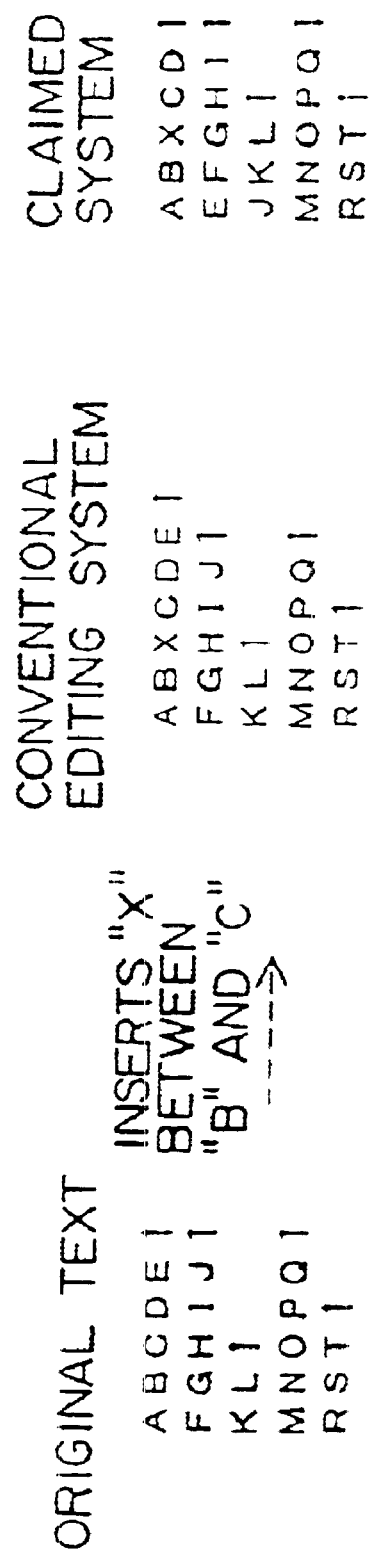

ORIGINAL TEXT

```
A B C D E
F G H I J
K L M N
O P Q R S
T U
```

INSERTS "X" BETWEEN "B" AND "C"
----→

WHEN ONE LINE HAS BEEN COMPLETED

ORIGINAL TEXT

ABCDE
FGHIJ
KLMN
OPQRS
TU

INSERTS "X"
BETWEEN
"B" AND "C"
---→

FIG. 8(a)

PREFERRED
EMBODIMENT
SHOWN IN FIG. 7

ABXCD
EFGHI
JKLMN

OPQRS
TU

FIG. 8(b)

THIS PREFERRED
EMBODIMENT

ABXCD
EFGHI
JKLMN
OPQRS
TU

FIG. 8(c)

(a) ORIGINAL TEXT DATA          A B C D E F G H I J K L M N O P Q P R
(b) DELETES "C"                 A B D E F G H I J K L M N O P Q P R
(c) LINE FEED CODE SHIFT 1      A B D E F G H I J K L M N O P Q P R
(d) LINE FEED CODE SHIFT 2 (END OF PROCESS)  A B D E F G H I J K L M N O P Q P R
(e) DELETES "D"                 A B E F G H I J K L M N O P Q P R
(f) LINE FEED CODE SHIFT 1      A B E F G H I J K L M N O P Q P R
(g) DELETES THE LINE FEED CODE SINCE THERE   A B E F G H I J K L M N O P Q P R
    IS NO ADVANCEMENT

FIG. 12

(a) ORIGINAL DATA                         A B C D E F G H I J K 1 L M N O P 1 Q P R 1
(b) DELETS "C"                            A B D E F G H I J K 1 L M N O P 1 Q P R 1
(c) LINE FEED CODE SHIFT 1                A B D E F G H I J K 1 1 L M N O P 1 Q P R 1
(d) LINE FEED CODE SHIFT 2                A B D E F G H I J K 1 1 1 L M N O P 1 Q P R 1
(e) DELETES THE LINE FEED CODE            A B D E F G H I J K I L M N O P 1 Q P R 1
    (END OF PROCESS)

FIG. 14

(a) ORIGINAL TEXT DATA          A B D E F G H I J K L M N O P Q R
(b) DELETES "D"                 A B E F G H I J K L M N O P Q R
(c) LINE FEED CODE SHIFT 1      A B E F G H I J K L M N O P Q R
    (END OF PROCESS)

USER INPUT

FIG. 15

```
(a) ORIGINAL TEXT DATA                                          A B C D E   F G H I J K L M N O   P Q R
(b) INSERTS "X"                                                 A B X C D E   F G H I J K L M N O   P Q R
(c) LINE FEED CODE SHIFT 1                                      A B X C D   E F G H I J K L M N O   P Q R
(d) LINE FEED CODE SHIFT 2                                      A B X C D   E F G H I J K L M N O   P Q R
(e) INSERTS "Y" (◊ : UNPROCESSED MARK)                          A B X Y C D   E F G H I ◊ J K L M N O   P Q R
(f) LINE FEED CODE SHIFT 1                                      A B X Y C   D E F G H I ◊ J K L M N O   P Q R
(g) LINE FEED CODE SHIFT 2                                      A B X Y C   D E F G H I ◊ J K L M N O   P Q R
(h) COLLECTIVE PROCESS (BECAUSE THERE IS A ◊ MARK)  A B X Y C   D E F G H I   J K L M N O   P Q R
(i) COLLECTIVE PROCESS 2                                        A B X Y C   D E F G H I   J K L M   N O P Q R
(j) COLLECTIVE PROCESS 3                                        A B X Y C   D E F G H I   J K L M   N O P Q R
```

FIG. 17

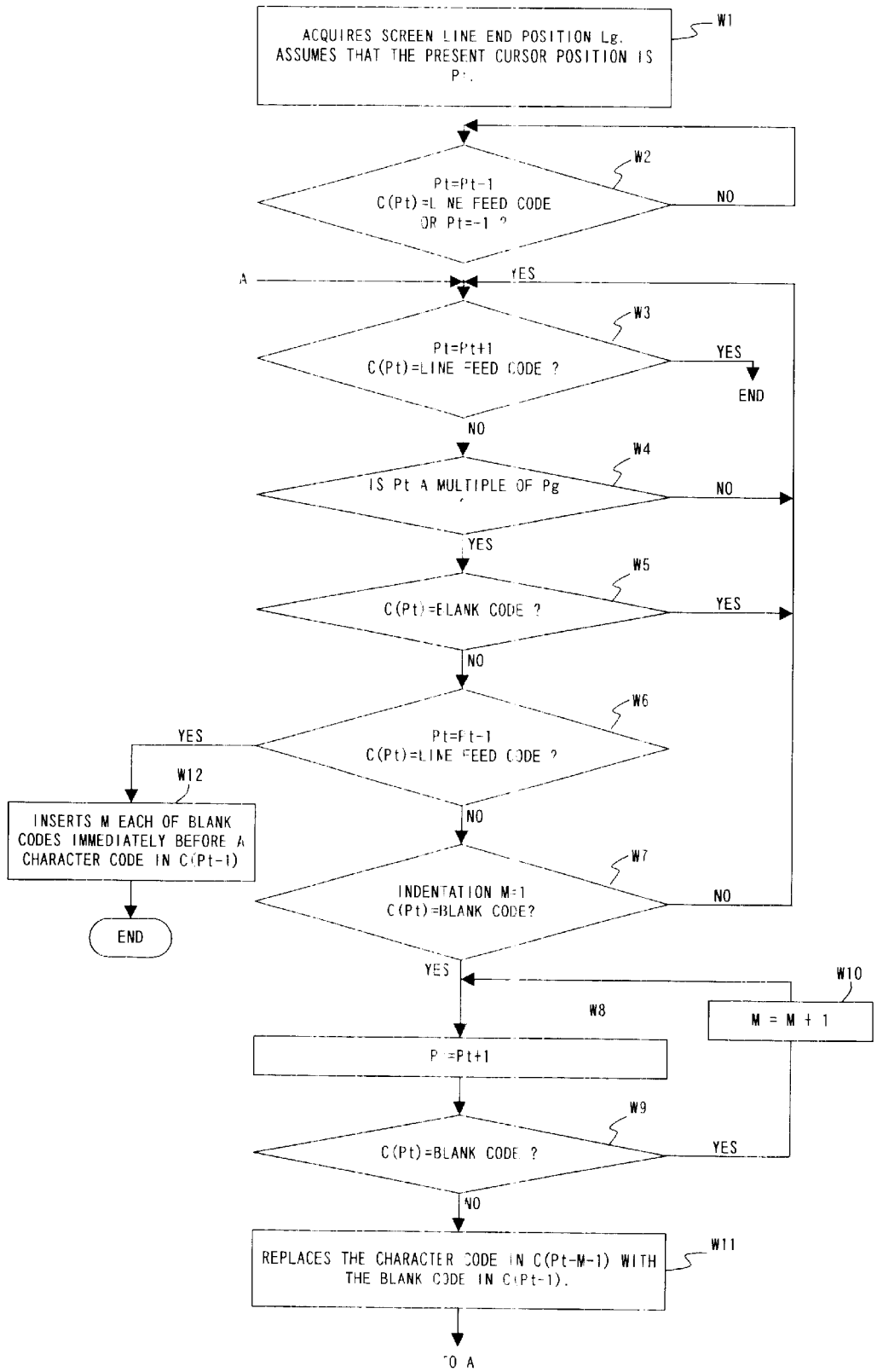
F I G. 1 9

ORIGINAL TEXT

ORIGINAL TEXT

1. ABCDEFGH
IJKLMNOP
QRSTI

FIG. 22(a)

INSERTS "X"
BETWEEN
"B" AND "C"
- - - →

CONVENTIONAL
EDITING SYSTEM

1. ABXCDEFG
H   IJKLMNO
P   QRSTI

FIG. 22(b)

CLAIMED SYSTEM

1. ABXCDEFG
HIJKLMNO
PQRSTI

FIG. 22(c)

ORIGINAL TEXT

1. ABCDEFGH
IJKLMNOP
QRSTUVWX

INSERTS "X"
BETWEEN
"B" AND "C"
---→

1. ABCDEFG HIJKLMNO PQRSTUVWX → 1. ABCDEFG HIJKLMNO PQRSTUVWX

FIG. 23(a)

WHEN A NEWLINE
IS CREATED

1. ABXCDEFG
HIJKLMNO
PQRSTUVW
X1

FIG. 23(b)

TEXT EDITING SYSTEM

BACKGROUND OF THE INVENTION

1. Field of the Invention

The present invention relates to a text editing system with a line feed function and an indentation function.

2. Description of the Prior Art

Today, word processors and personal computers in which word processing software is built in are being widely used as document composition tools. When these tools are used, a setting process relating to a document style is executed prior to the composition of a document, and a text editing process is executed during the composition of a document. For example, the left and right margins of lines of a document, the number of characters per line, the number of lines per page, the size of a used font, etc., are set prior to the composition of a document. Every time a character is inserted or deleted during the composition of a document, an editing process is executed and the data of a document file is rewritten.

In a conventional text editing system, such as a word processor, etc., in order to set the left and right margins of lines, a special code for a margin was used, or special information for line control was used, separately from character codes. A special code for a margin, for example, varies with the type of word processor or computer, and the line end line feed position was set by inserting this code. Special information for line control is stored in a document formatting file provided separately from document files. In this formatting file, for example, information about the position of a character and the layout of a document, and even information about line feed, etc., are stored, and by referring to these pieces of information, a document is composed.

Therefore, since document editing is performed based on a special code, etc., the number of characters per line and the number of blanks at the head of a line in a document were not counted and the document was not edited based on the count result when a character has to be shifted to the next line or a character has to be acquired from the next line during document editing.

Japanese Laid-open Patent Gazette (Japanese Patent Laid-open No. 10-162004) discloses a character string display apparatus for displaying character strings in good order while maintaining the indented display of character strings when the size of the rectangular area of a window screen for displaying character strings is changed.

However, the above-described conventional text editing system has the following problems.

First, since a document composed using a special code for margin or special information for line control depends heavily on the type of word processor or computer, the document cannot be handled in a different type of text editing system. Therefore, document compatibility is low, allowing only very low-versatility documents to be composed.

If a file for format setting is used separately from document files, the number of files increases and the greater number of files requires a large memory capacity, which occupies a large part of the memory capacity of a storage unit.

Furthermore, in the case of the above-described Japanese Patent Laid-open No. 10-162004, although a blank maintaining process is executed when the size of a window screen is changed, a prescribed blank maintaining process is not executed when a character is inserted or deleted.

SUMMARY OF THE INVENTION

A goal of the present invention is to provide a high-portability text editing system such that the above-described problem can be solved. A body of text composed using the text editing system of the present invention can be handled in a general viewer or editor and a high-versatility text can be composed.

According to the present invention, the above-described objective can be achieved by providing a text editing system for editing a body of text in such a way that each line is left-justified and the number of characters per line is always within a prescribed limit. The text editing system comprises a line end position storage unit for storing a line end position, a line feed code detection unit for detecting a line feed code in text, a character code count unit for counting the number of character codes between the head of a body of text and up to immediately before the first line feed code detected by the line feed code detection unit, or the number of character codes located between line feed codes detected by the line feed code detection unit, and a line code position shift unit for shifting the position of the latest line feed code detected by the line feed code detection unit to immediately after the line end position if the number of character codes counted by the character code count unit and the line end position stored in the line end position storage unit do not match.

The line end position storage unit stores information indicating the line end position of a line, and allowing, for example, a predetermined value to be used. The maximum line end position in text (a document), the end position of the most frequently occurring line in a body of text, the end position of the first line in a text or if a plurality of lines with the same number of characters continue in a body of text, the end position of a plurality of lines can also be used for the line end position. Alternatively, the end position of a line immediately before a line in which a character is inputted can be used as the line end position.

The line feed code detection unit detects a line feed code included in a body of text, which is a high-versatility code used in a body of text.

The line feed code shift unit shifts the position of a line feed code when the number of characters in a specific line of a body of text is changed by inserting or deleting a character in the line. For example, when N characters are inserted in a specific line of a body of text, the number of characters in the line increases by N. For example, when N characters are deleted from a specific line of a body of text, the number of characters in the line decreases by N (assuming that the original number of characters of the specific line is M, M>N is assumed). In such a case, the line feed code shift unit shifts the position of the line feed code in such a way that the number of characters of all lines following the line in which an insertion/deletion is being made except for the last line, becomes N. In this case, the number of characters in the last line becomes N or less.

The first aspect of the present invention can also comprise a count unit for counting the number of characters per line in a body of text and an editing unit for shifting characters to or acquiring characters from the next line by the same number of characters that were inserted or deleted in the line, without changing the number of characters in the line and for editing lines when characters are inserted or deleted in a specific line of a body of text during editing. In this case, the count unit corresponds to the count unit of the first preferred embodiment described later, and the editing unit corresponds to the line feed code position shift unit in the first preferred embodiment. In this case, "when characters are inserted or deleted in a specific line of a body of text during editing" includes a case where a user directly edits a specific line as well as a case where as a result of the user directly editing a specific line, another line is also edited.

According to the text editing system in one aspect of the present invention having the above-described configuration, a body of text can be edited in such a way that all lines of a body of text are left- and right-justified using line feed codes.

According to the second aspect of the present invention, the above-described object can be achieved by providing a text editing system for editing a body of text in which one or more prescribed blank codes are permanently located. The text editing system comprises a screen line end position storage unit for storing the number of characters per line of a screen, a blank code detection unit for detecting black codes in a body of text, a character code count unit for counting the number of character codes between the head of a body of text up to immediately before the first blank code detected by the blank code detection unit, or the number of character codes located between two bank codes detected by the blank code detection unit, and a blank code position shift unit for locating the prescribed number of blank codes at the head of the line by replacing the position of a blank code detected by the blank code detection unit with the position of a character code existing before the blank code.

The second aspect of the present invention can also comprise a count unit for counting the number of characters of the next line and the number of blanks at the head of a blank portion when characters are inserted or deleted in a specific line of a body of text during editing and an editing unit for shifting characters by the same number of characters as inserted or deleted in the line, without changing both the number of characters and the number of blanks at the head of the next line, and editing lines when characters are inserted or deleted in a specific line of a body of text. In this case, the count unit corresponds to the character code count unit in the second preferred embodiment described later, and the editing unit corresponds to the blank code position shift unit in the second preferred embodiment. In this case, "when characters are inserted or deleted in a specific line of a body of text during editing" includes a case where a user directly edits a specific line as well as a case where as a result of the user directly editing a specific line, another line is also edited.

The second aspect of the present invention relates to an indentation function. For example, if the second and subsequent lines are indented and if characters are inserted or deleted in a specific line, a body of text can be edited in such a way that the same indentation as that made in the original body of text can be made by replacing the position of a blank code shifted by the blank code position shift unit with the position of the character code based on the detection results of the screen line end position storage unit and blank code detection unit and the count result of the count unit. In this case, since the blank code portion at the head of a line is judged and processed as an indentation, there is no need for a file in which a special code and information about indentation are stored, and thereby an indentation function can be realized simply by setting the number of characters per line of a screen.

BRIEF DESCRIPTION OF THE DRAWINGS

FIG. 5 explains original text data.

FIG. 6A shows original text data.

FIG. 6B shows a text editing result obtained from a conventional editing system.

FIG. 6C shows a text editing result obtained from a preferred embodiment of the present invention.

FIG. 7 is an example of a process for creating a new line feed code immediately after the number of characters of the third line has become 5 in an editing process after insertion.

FIG. 8 is an example of a case where a blank code is inserted before the line feed code in the case shown in FIG. 7.

FIG. 12 is an example of a consecutive deletion process.

FIG. 14 shows the first concrete example of the process in the flowchart shown in FIG. 13.

FIG. 15 shows the second concrete example of the process in the flowchart shown in FIG. 13.

FIG. 17 shows a concrete example of a high-speed process after insertion.

FIG. 19 is a flowchart showing an editing process after insertion in the second preferred embodiment.

FIG. 21 shows original text data.

FIG. 22A shows original text data.

FIG. 22B shows a text editing result obtained in a conventional editing system.

FIG. 22C shows a text editing result obtained in a preferred embodiment of the present invention.

FIG. 23 shows an example case where as a result of insertion, one character "X" is located at the head of the fourth line.

FIG. 24 is a flowchart showing an editing process after deletion in the second preferred embodiment.

FIG. 25 shows the data structure of a file.

FIG. 26 explains the deletion process of a blank code.

FIG. 27 shows a system configuration for realizing the text editing system of the present invention using a program recorded in a storage medium.

DESCRIPTION OF THE PREFERRED EMBODIMENTS

The preferred embodiments of the present invention are described below with reference to the drawings.

The First Preferred Embodiment

Figure 1:
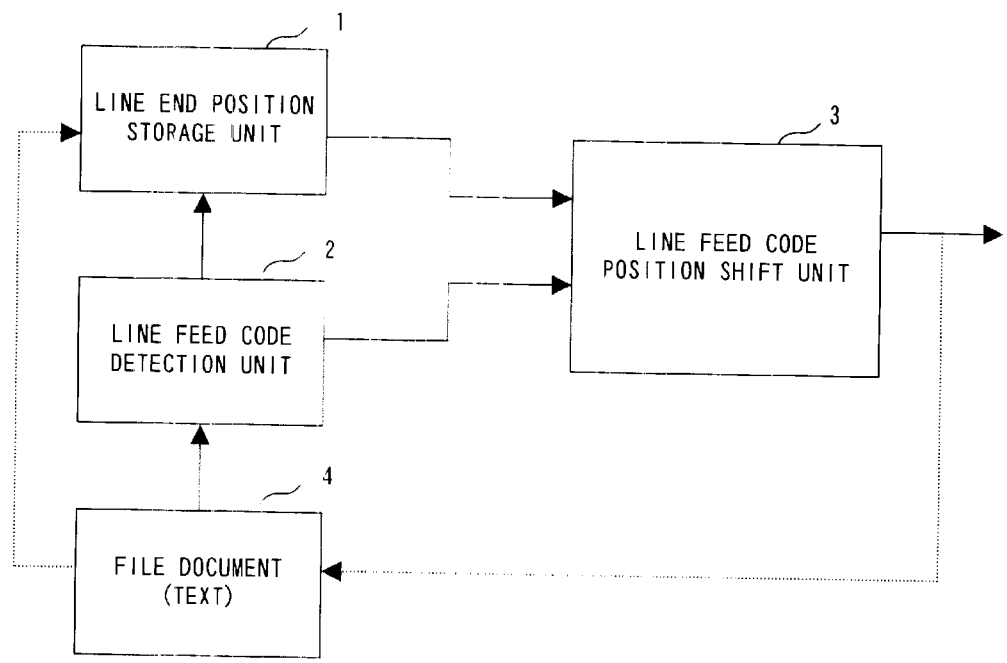
FIG. 1 shows the configuration of the text editing system in the first preferred embodiment.

FIG. 1 shows the configuration of the text editing system in the first preferred embodiment.

A line end position storage unit 1 shown in FIG. 1 stores information about a line end position, and stores, for example, a predetermined value. For example, information about the maximum line end position in a document (text) written in a file 4, the end position of the line that most frequently appears in a body of text (document), the end position of the first line in a body of text (document), or if there is a plurality of lines with the same number of consecutive characters in a body of text (document), the end position of a plurality of lines can also be registered. The maximum line end position information of each line in a document stored in the file 4, the end position information of the first line of each page in a document and the line end position information in the case where a plurality of lines with the same number of consecutive characters in a document, for example, are obtained when a document (text) is written in the file 4.

Figure 2:
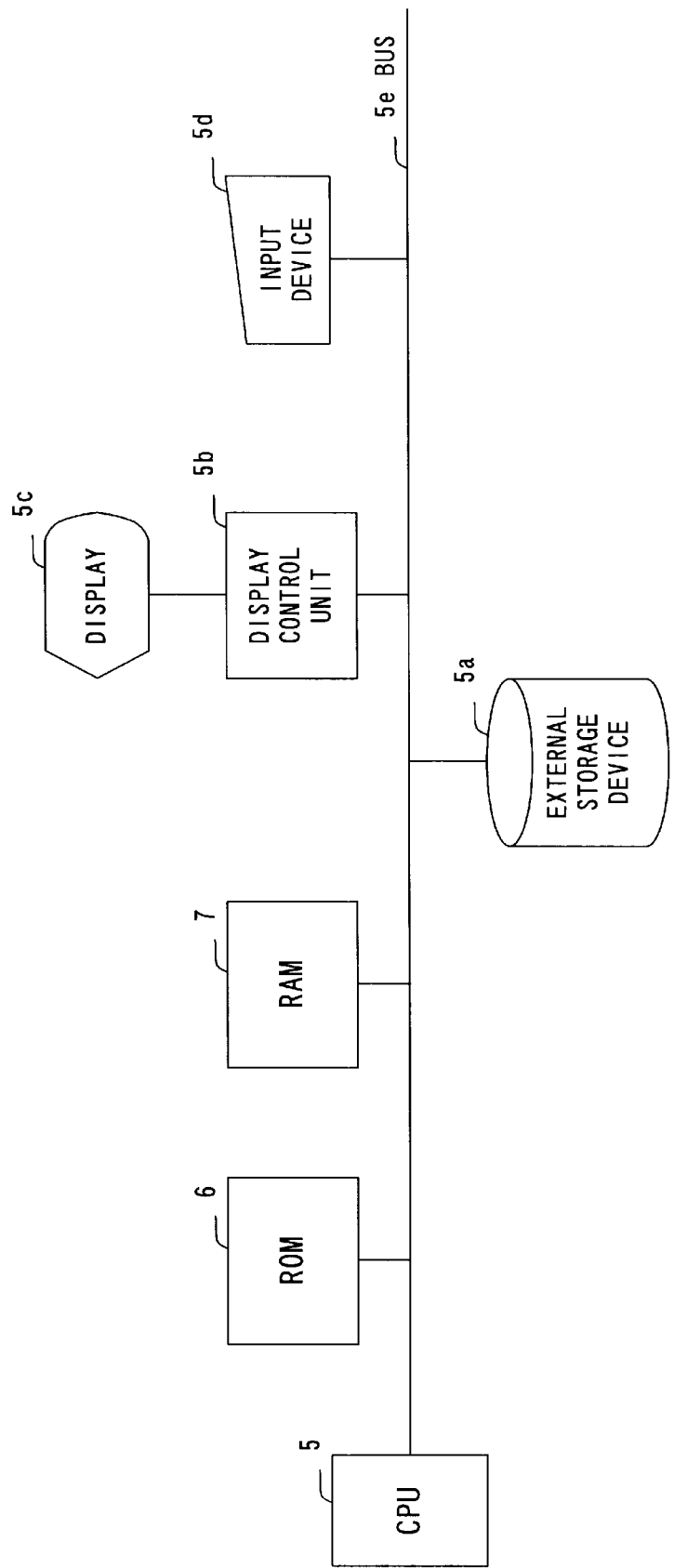
FIG. 2 shows a system configuration for realizing the text editing system in the first preferred embodiment using a computer.

A line feed code detection unit 2 shown in FIG. 2 detects the position of a line feed code in a document (text) stored in the file 4. Generally, this line feed code is used.

A line feed code position shift unit 3 shown in FIG. 2 shifts the position of a line feed code to the line end position and simultaneously shifts the character codes of the line to the next line, or it acquires character codes from the next line when the above-described position information about a line feed code and line end position information does not match because an insertion or deletion was made.

FIG. 2 shows a system configuration for enabling a computer, such as a personal computer, etc., to execute the processes of the text editing system (hereinafter called a "text editing process") in the first preferred embodiment. The system is comprised of a CPU (Central Processing Unit), an external storage device 5a, a display control unit 5b, a display 5c, an input device 5d, a ROM (Read-Only Memory) 6, a RAM (Random Access Memory) 7, etc., and the ROM 6 stores a program for realizing the functions of the line feed code detection unit 2 and line feed code position shift unit 3 shown in FIG. 1 by way of a software process.

The external storage device 5a, display control unit 5b, ROM 6, and RAM 7 are connected to the CPU 5 by a bus 5e, and the input device 5d is connected to the CPU 5 by both an input control unit, which is not shown in FIG. 2, and the bus 5e. The external storage device 5a stores the above-described file 4. The display 5c is connected to the CPU 5 by the display control unit 5b. The input device 6d is used when a user composes a body of text and edits the text, and includes a keyboard, mouse, etc.

The CPU 5 executes the text editing process in this preferred embodiment according to a program stored in the ROM 6, and executes the line feed process in this preferred embodiment. In this case, the RAM 7 is used as a text buffer or work area, and the display 5c displays a document in the text editing process.

When executing each editing process described later, the CPU 5 reads a file 4 from the external storage device 5a and loads a text buffer secured in the RAM 7 with a body of text stored in the file 4. The second preferred embodiment described later can also be realized by way of a software process of a computer with the same configuration as shown in FIG. 2.

The text editing process of this preferred embodiment is clearly described below using a flowchart. The text editing process in this preferred embodiment includes a process for inserting a character in a body of text stored in a file 4 and a process for deleting a character from the text, which are separately described. For adding a process for executing those editing processes at a high speed, the three processes of <<Editing process after insertion>>, <<Editing process after deletion>> and <<High-speed editing process>> are separately described below.

<<Editing Process After Insertion>>

First, an editing process after inserting a character in a body of text is described.

Figure 3:
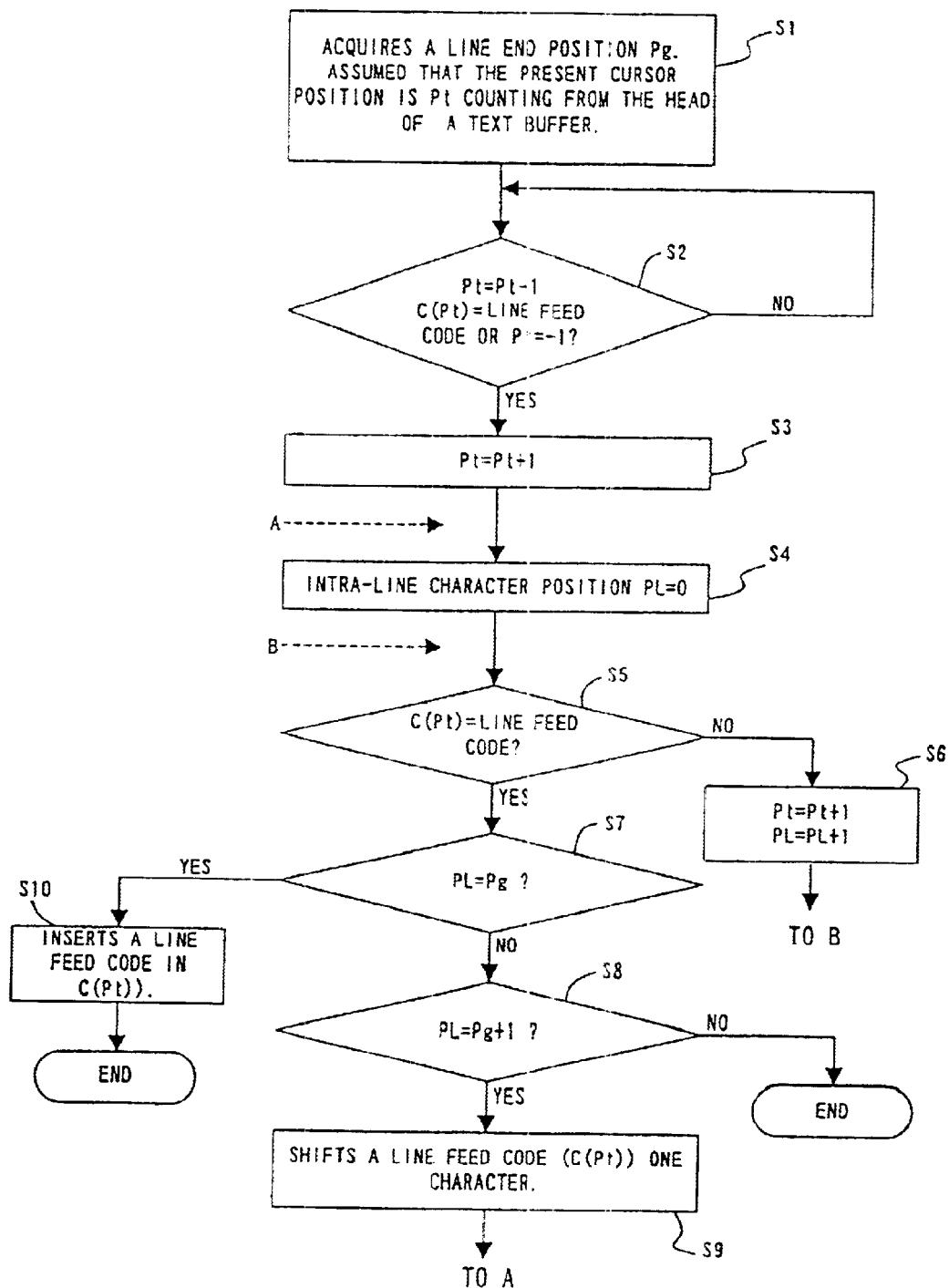
FIG. 3 is a flowchart showing the editing process after insertion in the first preferred embodiment.

FIG. 3 is a flowchart showing the editing process after character insertion in the first preferred embodiment. It is assumed that, for example, one page of text data is written in a file 4 prior to the commencement of the process shown in FIG. 3. It is also assumed that although in the writing process, the line end position information of the text data is stored in the line end position storage unit 1 described earlier, "5" is set for the line end position in this preferred embodiment.

Figure 4:
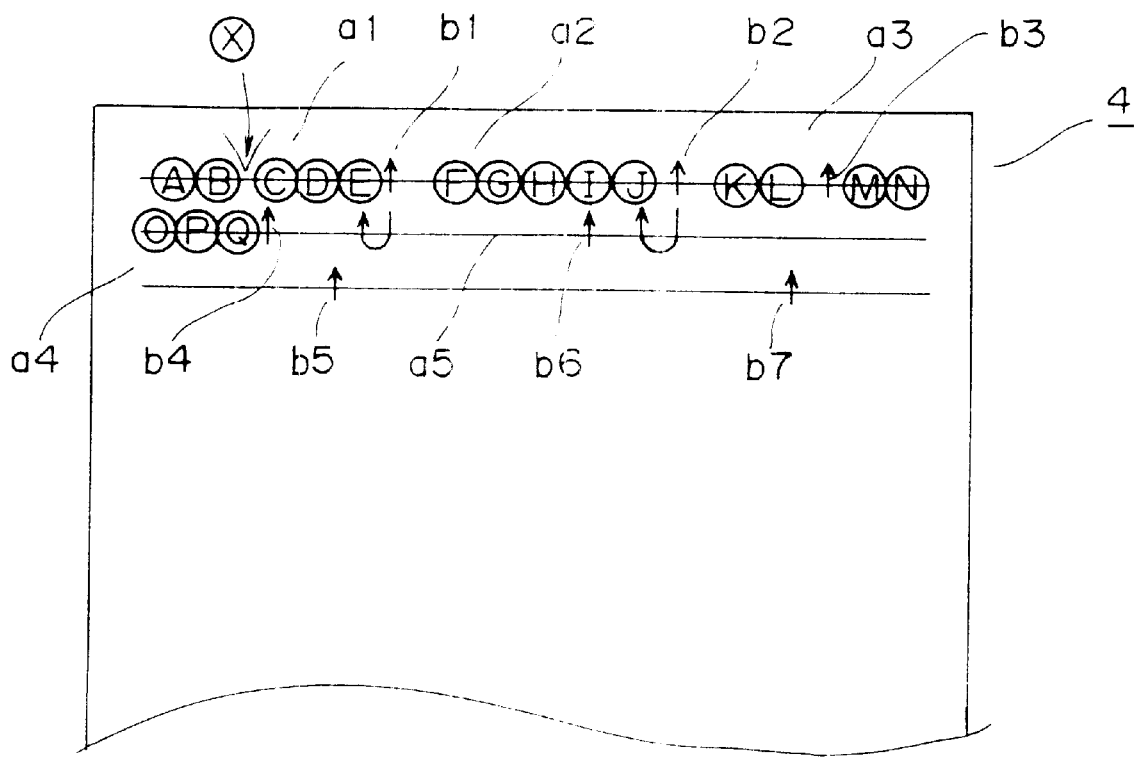
FIG. 4 shows the data structure of a file.

Real text information consists of a series of codes, such as character codes, line feed codes, etc., and the data structure of the file 4 is, for example, as shown in FIG. 4. In FIG. 4, a1, a2, a3, . . . and b1, b2, b3, . . . , indicate a character code string and a line feed code string, respectively. If original text data are "A, B, C, D, E, ↑ (line feed code), F, G, H, I, J, ↑ (line feed code), K, L, ↑ (line feed code), M, N, O, P, Q, ↑ (line feed code), . . .", a character code string a1 is a series of character codes "A, B, C, D, E", a character code string a2 is a series of character codes "F, G, H, I, J", a character code string a3 is a series of character codes "K, L" and a character code string a4 is a series of character codes "M, N, O, P, Q".

The editing process after insertion in this preferred embodiment is described below with reference to the flowchart shown in FIG. 3. Here, for simplicity, the description is made using the text stored in the file 4 shown in FIG. 4. FIG. 6A shows the content of a body of text (original text) stored in a text buffer. Although in FIG. 6A, the content of the text buffer is displayed with character code strings line-fed for each line feed code (↑) so as to match the screen display image of the display 5c, the character codes and line feed codes shown in FIG. 6A are actually stored in succession in the text buffer. Specifically, a code string "ABCDE↑FGHI↑KL↑MNOPQ↑RST↑" is stored in the text buffer. Here, for the sake of convenience, a description is given assuming that FIG. 6A shows the display screen of the display 5c prior to the user's insertion of a character "X" between characters "B" and "C" of the code string (in this case, line feed codes are not displayed).

Since a line end position is set to "5", as described earlier, a maximum of five characters are displayed in a line. In FIG. 6A, a maximum of five characters are displayed in the first, second, and fourth lines. If in such a state, "X" is inserted between "B" and "C" of the character string "ABCDE" of the first line, the CPU 5 inserts a character code "X" between the character codes "B" and "C" in a text buffer secured in the RAM 7. As a result, the content of the text buffer becomes as shown in FIG. 6B. Specifically, the content of the text buffer becomes a code string "ABXCDE↑FGHI↑KL↑MNOPQ↑RST↑".

Although according to the conventional text editing system, the content of the text buffer at this stage is transferred to a display position designation unit, according to the present invention, a process shown in the flowchart of FIG. 3 is executed, and as a result, the obtained content of the text buffer is transferred to a display position designation unit.

The CPU 5 first acquires a line end position Pg from the line end position storage unit 1 (step S1). Pg is a variable for storing a line end position. The CPU 5 retrieves the text buffer and at this time, a cursor is located on the screen of the display 5c. The CPU 5 calculates the position in the text buffer of a character (position at the head of the text buffer) and sets the position to a variable Pt for storing the position in the cursor position in the text buffer (S1). Pt is a variable for indicating the position of a code in a text buffer, and the leading storage position of a code in the text buffer is "0".

In this example, it is assumed that a cursor indicates "C". In this case, the value of Pt becomes "3". It is also assumed that the cursor position of a leading code in a text buffer is "0".

Then, the CPU 5 decrements the value of Pt by one, and judges whether C(Pt) equals a line feed code or Pt=−1 holds true (S2). C(Pt) is a variable indicating the Pt-th code in the text buffer (Pt=0, 1, 2, . . . ). Pt=−1 indicates that retrieval up to the leading code in the text buffer has been completed.

In this case, since Pt=3 and C(Pt)="C" hold true, the judgment (S2) is NO. The judgment in step S2 is repeated until it becomes YES. In this case, in step S2, the value of Pt is decremented as follows: 3→2→1→0→−1. And, when Pt=−1 results, the judgment in step S2 becomes YES. Although in this example, it is judged that Pt=−1 holds true, for example, if a character is inserted in the second or subsequent line, in step S2, it is judged that C(Pt)=line feed code holds true. The line code in this case is a line feed code immediately before the line in which a character is inserted.

If in step S2, the judgment becomes YES, the value of Pt is incremented by one (S3). Therefore, the value of Pt is set to "0".

Then, an intra-line character position PL is set to "0" (S4). If the leading code of a body of text is a character code, PL is the number of character codes located up to a character code that is immediately before the first line code of the text including the leading character code. Otherwise, PL is a variable used to count the number of character codes located between two line feed codes in the text.

After step S4, it is judged whether C(Pt) equals a line feed code (S5). In this case, since at first C(Pt)=character code "A" holds true, the judgment in step S5 becomes NO. If the judgment in step S5 is NO, both the values of Pt and PL are incremented by one (S6).

Since the content of the text buffer is "ABXCDE↑FGH . . ." in this example, the judgment in step S5 is repeated seven times, and the seventh judgment in step S5 becomes YES. Since the process in step S6 is repeated six times before this judgment is made, the values of Pt and PL are "7" and "6", respectively.

If in step S5, a YES judgment is made, it is judged whether PL=Pg holds true (S7). In this case, since PL=6 and Pg=5 hold true, the judgment in step S7 becomes NO. Then, it is judged whether PL=Pg+1 holds true (S8). In this case, since PL=6 and Pg=5 hold true, the judgment in step S8 becomes YES, and the line feed code (C(Pt)) in the text buffer is shifted forward one character (one code) (S9). Specifically, the Pt-th code (line feed code) in the text buffer is replaced with the (Pt−1)th code (in this case, a character code "E"). As a result, the content of the text buffer is modified from "ABXCDE↑FGHIJ↑K . . ." to "ABXCD↑EFGHIJ↑K . . .".

When the process in step S9 is completed, the flow returns to step S4, and after resetting the value of PL to "0", the flow proceeds to the process in step S5. At this time, the value of Pt is "7". Since C(7)=character code "E" holds true as a result of the position replacement of the line feed code in the text buffer in step S9, the first judgment in step S5 becomes NO, and as described above, the processes in steps S5 and S6 are repeated until it is judged that C(Pt)=line feed code results.

In this case, since the content of the text buffer is "ABXCD↑EFGHIJ↑K . . .", the processes in steps S5 and S6 are repeated until Pt=13 results.

If Pt=3 results, in step S5 it is judged that C(Pt)=line feed code, and the flow proceeds to step S7. Since up to this point the process in step S6 has been repeated six times, Pt=6 holds true. Therefore, the judgment in step S6 is NO as judged previously, and the processes in steps S8 and S9 are executed again.

As a result, the content of the text buffer becomes "ABXCD↑EFGHI↑JKL↑MNOPQ↑RST↑".

After the process in step S9 the flow returns to step S4, and PL is reset to "0". At this time, Pt=13 holds true. Therefore, the judgment in step S5 starts from the 13-th character code "J" of the text buffer. Since at this time the content of the text buffer is "ABXCD↑EFGHI↑JKL↑MNOPQ↑RST↑", when Pt=16 results, the judgment in step S5 becomes YES and the flow proceeds to step S7. Since up to this point the process in step S6 has been repeated three times, PL=3 holds true. Therefore, the judgment in step S7 becomes NO, and the flow proceeds to step S8.

Since in this case PL=3 holds true, the judgment in step S8 becomes NO, and the process after insertion in the flowchart shown in FIG. 3 is terminated.

As a result of the above-described processes, the original text shown in FIG. 6A is modified to the text shown in FIG. 6C. FIG. 6B shows a body of text obtained performing the same operations in the conventional text editing system.

However, in this preferred embodiment, since the content of the text buffer is edited as shown in FIG. 6C, it is sufficient if the display position designation unit outputs the content of the text buffer to a display control unit. Thus, the display control unit displays the text in the form of an image as shown in FIG. 6C. Actually, a line feed code (↑) is not displayed, and is used only for the display control unit to control line feed.

Next, a process after insertion in the case where "X" is inserted between the "B" and "C" in an original body of text (text data) "ABCDE↑FGHIJ↑KLMN↑OPQRS↑TU↑" as shown in FIG. 7A, is described with reference to the flowchart shown in FIG. 3. In this case, the content of a text buffer becomes "ABXCDE↑FGHIJ↑KLMN↑OPQRS↑TU↑" as shown in FIG. 6A. In this case, the process leading up to a code string "ABXCDE↑FGHIJ↑" is the same as in FIG. 6A. Specifically, the processes in steps S4 through S9 are repeated twice, and as a result, the content of the text buffer is modified to "ABXCD↑EFGHIJ↑KLMN↑OPQRS↑TU↑", and then to "ABXCD↑EFGHI↑JKLMN↑OPQRS↑TU↑". At this time, since Pt=3 holds true, the flow returns from step S9 to step S4. After step S4, Pt=0 is reset, the processes in step S5 and S6 are repeated five times. When the value of Pt becomes "18", in step S5 it is judged that C(Pt)=line feed code results. At this time, the value of PL is "5". Thus, after the judgment in step S5 becomes YES, in step S7 it is judged that PL=Pg results. As a result, judgment in step S7 becomes YES, the flow proceeds to step S10. In step S10, a line feed code is inserted in C(Pt), that is, C(18).

As a result, the content of the text buffer becomes "ABXCD↑EFGHI↑JKLMN↑↑OPQRS↑TU↑", and a body of text composed of six lines, typically as shown in FIG. 7B, is displayed. In this way, if as a result of the character insertion, the number of characters in a specific line becomes equal to a value stored in the line end position storage unit 1. A line feed code is automatically inserted immediately after the line.

In the flowchart shown in FIG. 3, the process in step S10 can also be replaced with a process to insert a blank code (_) in C(Pt).

In this way, if the original body of text is "ABCDE↑FGHIJ↑KLMN↑OPQRS↑TU↑", as shown in FIG. 8A, and "X" is inserted between "B" and "C", the text is modified to "ABXCD↑EFGHI↑JKLMN_↑OPQRS↑TU↑", as shown in FIG. 8B. FIG. 8B shows a body of text obtained by performing the above described insertion in the process of the preferred embodiment in the flowchart shown in FIG. 3.

Another code, with the exception of a blank code, (for example, EXT) can also be used.

Also, a line end position can be set manually by a user or the system can be configured in such a way that a line end position can be automatically set. If a line end position is automatically set and a body of text is retrieved, for example, a maximum line end position in a body of text, the line end position that most frequently appears in a body of text, the line end position of the first line in a text, the head of a body of text or the line end position of a plurality of consecutive lines, of which each line has the number of characters, is stored in the line end position storage unit 1 as a line end position.

<<Editing Process After Deletion>>

Next, an editing process after deletion is described.

Figure 9:
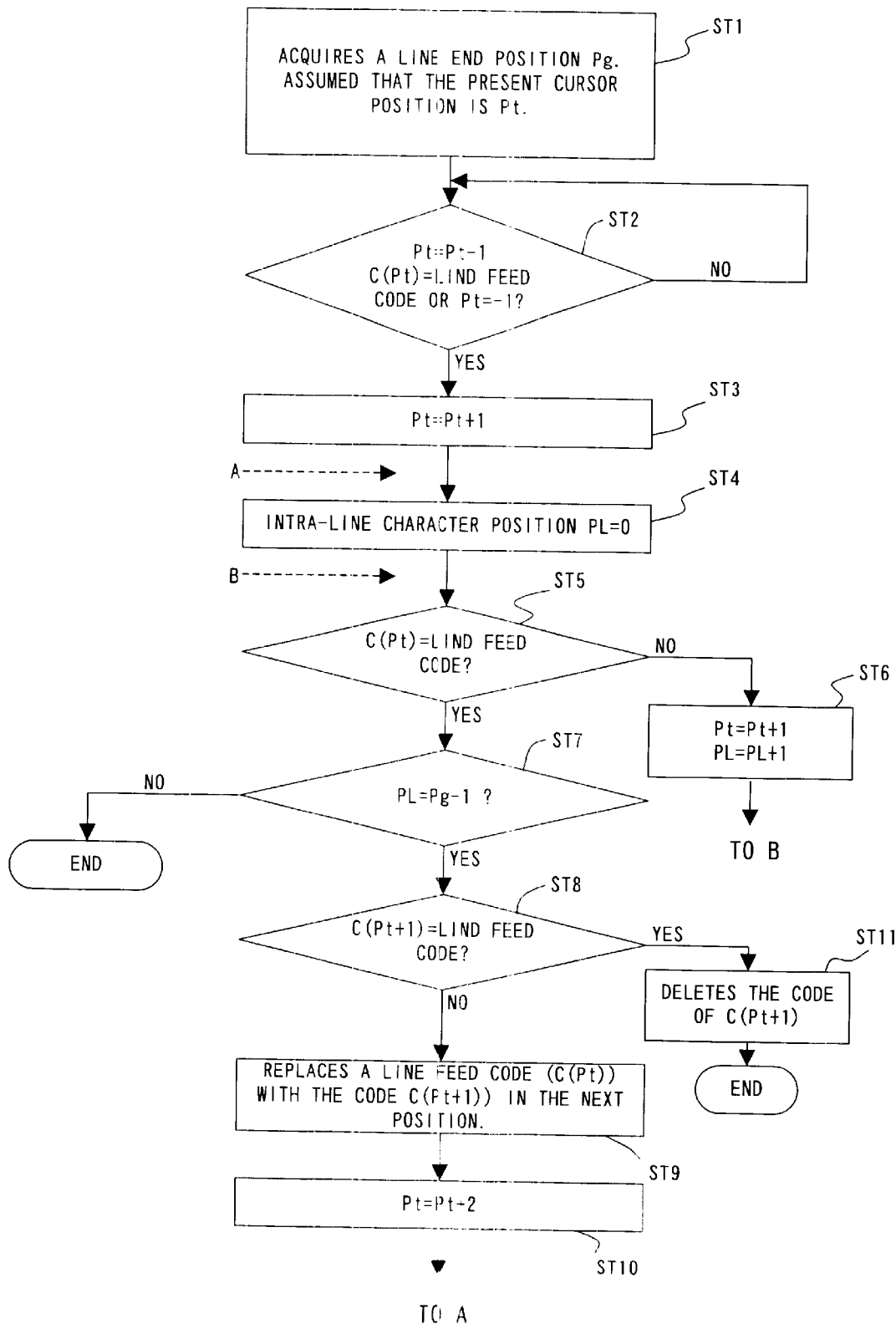
FIG. 9 is a flowchart showing the first example of a test editing process after deletion in the first preferred embodiment.
Figure 10:
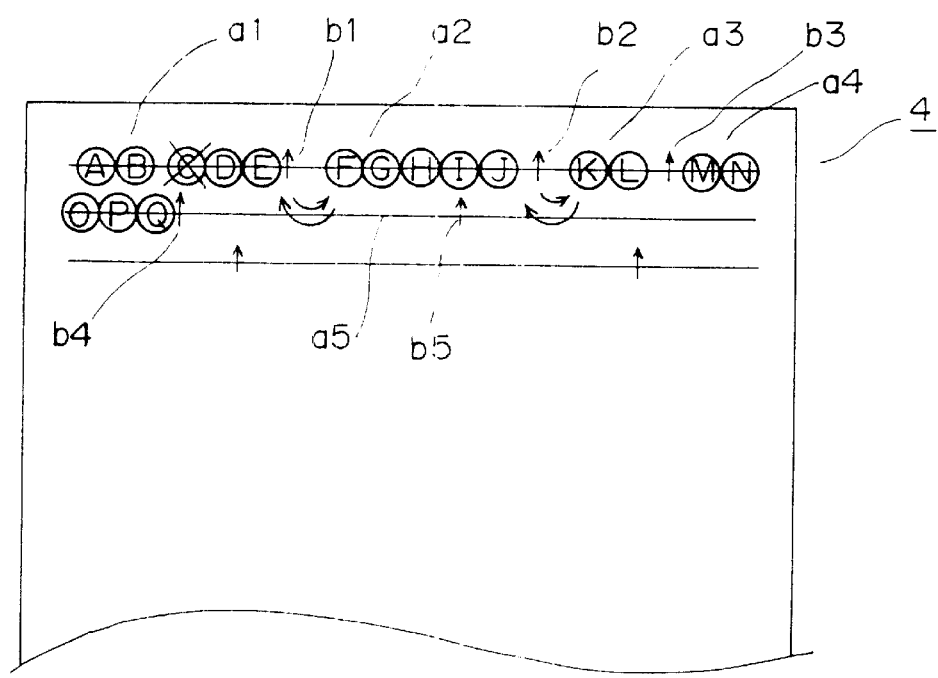
FIG. 10 shows the data structure of a file.

FIG. 9 is a flowchart showing a test editing process after deletion. Here, it is also assumed that prior to the commencement of a text editing process, for example, one page of text data as shown in FIG. 10, is written in a file 4. It is also assumed that information about a line end position set using one of the variety of setting methods described above is stored in the line end position storage unit 1. The variables Pg, Pt, C(Pt) and PL used in the flowchart shown in FIG. 9 are the same as those used in the flowchart shown in FIG. 3.

Real text information is a series of character codes and line feed codes, which has, for example, a memory configuration as shown in FIG. 10. In the same way as in the file 4 shown in FIG. 4, a1, a2, a3, ... and b1, b2, b3, ... indicate character code strings and line feed codes, respectively.

If a user deletes a character in a specific line in a state where a body of text stored in the file 4 shown in FIG. 10 is read in a text buffer of the RAM 7 and the content is displayed on the display 5c, the CPU 5 executes the processes in the flowchart shown in FIG. 9.

Figure 11:
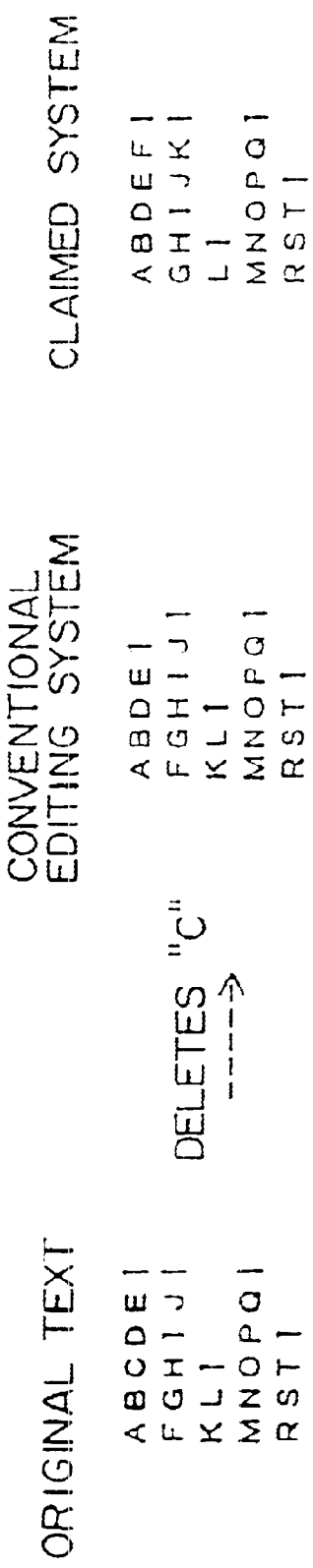
FIG. 11A shows original text data.
FIG. 11B shows a text editing result obtained in a conventional editing system.
FIG. 11C shows a text editing result obtained in a preferred embodiment of the present invention.

The following description of the flowchart is made assuming that the text shown in FIG. 11A is stored in the text buffer. In FIG. 11, as shown in FIG. 6, the content of the text buffer is displayed in the form of the screen display image of the display 5c. Specifically, FIG. 11A shows that a code string "ABCDE↑FGHIJ↑KLMNOPQ↑RST↑" is stored in the text buffer, and "ABCDE", "FGHIJ", "KL", "MNOPQ" and "RST" are displayed in the first through fifth lines, respectively, on the screen of the display 5c under the control of the display control unit 5b (a line feed code (↑) is not displayed).

It is assumed that in such a display state a user moves a cursor to "D" in the first line on the screen of the display 5c and that the user deletes "C". As a result, the content of the text buffer is modified to "ABDE↑FGHIJ↑KL↑MNOPQ↑RSTU↑" as shown in FIG. 11B. Although in the conventional text editing system, the process is terminated here, in this preferred embodiment, the process in the flowchart shown in FIG. 9 is executed by the CPU 5.

The CPU 5 first acquires a line end position Pg from the line end position storage unit 1, simultaneously acquires the present cursor position from an input control unit and sets the cursor position to a variable Pt for storing a cursor position in a body of text (ST1). In this example, Pg and Pt are set to 5 and 3, respectively.

Then, the value of Pt is decremented by one, and it is judged whether C(Pt)=line feed code or whether Pt=−1 holds true (ST2). This process in step ST2 is the same as the process in step S2 in the flowchart shown in FIG. 3. In this case, the process in step ST2 is repeated four times. When Pt=−1 results, judgment in step ST2 becomes YES and the flow proceeds to step ST3. The processes in steps ST2 through ST6 are the same as the processes in steps S2 through S6 in the flowchart shown in FIG. 3.

Thus, in this example, in step ST3, Pt is set to 0, and in step ST4, PL is set to 0. As a result, C(Pt)=character code "A" results, and the processes in step ST5 and ST6 are repeated until C(Pt) is judged to equal a line feed code. In this case, the value of Pt is incremented as follows 1→2→3→4. When Pt=4 results, in step ST5 it is judged that C(Pt)=line feed code holds true, and the flow proceeds to step ST. At this point, the value of PL is 4.

In step ST7, it is judged whether PL=Pg−1 holds true. This judgment is a process for judging whether the number of characters of a line in which a character is deleted is smaller by one than the line end position. In this case, since PL=4 holds true, the judgment in step ST7 becomes YES. Then, in step ST8 it is judged whether C(Pt)=line feed code holds true. Judgment in step ST8 is a process for judging in a process in step ST9 whether two line feed codes can continue. In this case, since Pt=5 and C(Pt+1)=character code "F" hold true, the judgment in step ST8 becomes NO, and the flow proceeds to step ST9.

In step ST9, a line feed code in C(Pt) is replaced with the next code of the line feed code in C(Pt+1). This process in step ST9 is a process for matching the number of characters in the line where a character is deleted, to the line end position. In this case, the position of the line feed code is replaced with the position of the next code of a character code "F". As a result, the content of the text buffer is modified to "ABCDEF↑GHIJ↑KL↑MNOPQ↑RST↑".

Then, after the flow proceeds to step ST10 and the value of Pt is incremented by two, the flow returns to step ST4. In this example, in step ST10 the value of Pt is set to "6". Thus, after step ST4, PL is reset to "0", the processes in steps ST5 through ST10 are applied to the second character code string "GHIJ" in the present text buffer in the same way as described above. In step ST9, a line feed code of C(10) is replaced with a character code "K" of C(11), and the content of the text buffer is modified to "ABDEF↑GHIJK↑L↑MNOPQ↑RST↑". At this point, the value of Pt is 10, and in step ST10, the value of Pt is set to 12. Then, the flow returns to step ST4, and the flow proceeds to the process of the third character code string "L" (Pt=2) in the present text buffer. Since the number of characters in this line is 1, the process in step ST6 is executed once. When Pt=3 and PL=1 result, in step ST5 it is judged that C(Pt)=line feed code holds true, and the flow proceeds to step ST7. Thus, in step ST17 it is judged that PL=Pg−1 does not hold true (NO in ST7) and the process is terminated.

As a result of the above-described processes, the content of the text buffer finally becomes "ABDEF↑GHIJK↑MNOPQ↑RST↑". As a result, as shown in FIG. 11C, the line end position (right end) of the first and second lines can be made uniform, as was the original text shown in FIG. 11A. According to the conventional editing system, since the character code to be deleted (in this example, a character code "C" in the first line) is simply deleted from the text buffer, as shown in FIG. 11B, if a character is deleted from a specific line, the right end of the line is indented. However, according to the present invention, even if a character is deleted from a specific line, the line is automatically edited in such a way that the position of a line feed code in the line can be set to the original position. Therefore, the right end can be set to the line end position stored in the line end position storage unit 1 using the line feed code.

Next, the operation in the case where "C" in the first line is deleted from original data "ABCDE↑FGHIJ↑K↑LMNOP↑QPR↑" shown in FIG. 12A and where the process in the flowchart shown in FIG. 9 is executed. In this case, if "C" is deleted, the content of the text buffer becomes "ABDE↑FGHIJ↑K↑LMNOP↑QPR↑", as shown in FIG. 12B.

Then, the processes in the flowchart shown in FIG. 9 are executed. First, the process in step ST9 described above (line feed code shift 1) is executed for a character code string in the first line, and as a result, the content of the text buffer becomes "ABDEF↑GHIJ↑K↑LMNOP↑QOR↑", as shown in FIG. 12C. Then, the process in step ST9 (line feed code shift 2) is executed for a character code string in the second line, and as a result, the content of the text buffer becomes "ABDEF↑GHIJK↑↑LMNOP↑QOR↑", as shown in FIG. 12D. At this point, the value of Pt is 10.

Therefore, in step ST10, the value of Pt is set to 12. In step ST5 through step ST4, it is judged that C(Pt)=line feed code holds true, and the flow proceeds to step ST7. In this case, since PL="0" holds true, judgment in step ST7 becomes NO, and the process is terminated as the content of the text buffer remains as shown in FIG. 11D. It is assumed that when the content of the text buffer is as shown in FIG. 11D, "D" in the first line in the text buffer is deleted. As a result, the content of the text buffer becomes "ABEF↑GHILK↑↑LMNOP↑QPR↑", as shown in FIG. 12E, and the processes in the flowchart shown in FIG. 9 are executed again. In this case, first, the process in step ST9 (line feed code shift 1) is executed for the character code string, and the content of the text buffer becomes "ABEFG↑HIJK↑↑LMNOP↑QPR↑", as shown in FIG. 12F. At this point the value of Pt is 4. Therefore, in step ST10, the value of Pt is set to 6, and through step ST4, the processes in steps ST5 and ST6 are repeated until in step ST5 it is judged that C(Pt)=line feed code holds true. When judgment in step ST5 becomes YES, judgment in step ST7 becomes YES since Pt=10 and PL=4 hold true. Then, since in step ST8 C(Pt)=line feed code holds true, judgment in step ST8 becomes YES. As a result, in step ST11 the line feed code of C(11) is deleted and the process is terminated.

As a result, the content of the text buffer becomes "ABEDG↑HIJK↑LMNOP↑QR↑" as shown in FIG. 11G. In this way, if a line feed code shift is performed and if a line feed code is shifted to the preceding line, the line feed code is automatically deleted.

There are a variety of methods for setting a line end position in the same way as the editing process after insertion described above. As shown in FIG. 12D, if two line feed codes continue, the latter line feed code can also be deleted. This can be realized by making the CPU 5 execute the process in the flowchart shown in FIG. 13.

Figure 13:
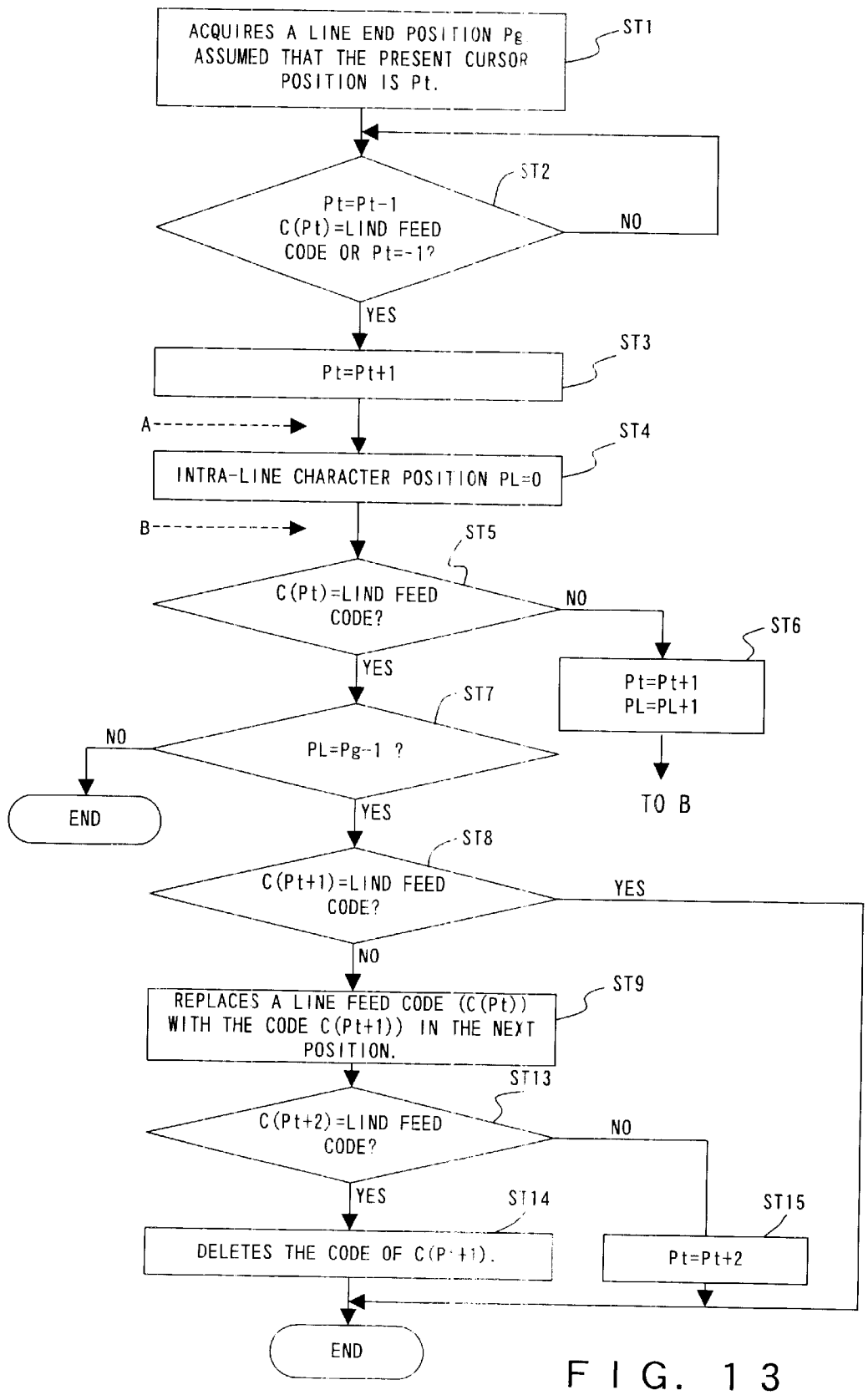
FIG. 13 is a flowchart showing the second example of a text editing process after deletion in the first preferred embodiment.

The flowchart shown in FIG. 13 can be obtained by replacing the step ST10 in the flowchart shown in FIG. 9 with steps ST13 through ST15 and by deleting step ST11 from the flowchart shown in FIG. 9. The processes in this flowchart are described with reference to FIG. 14. FIGS. 14A through 14E are the same as FIGS. 12A through 12G.

In step ST13, judgment is made as to whether both C(Pt+1) and C(Pt+2) become line feed codes as a result of the process in step ST9, and judgment is made as to whether C(Pt+2) is a line feed code.

In FIG. 14D, two line feed codes following a character code "K" correspond to C(Pt+1) and C(Pt+2). Therefore, in this case, judgment in step ST13 becomes YES.

If the judgment in step ST13 becomes YES, the line feed code in C(Pt+2) is deleted (step ST14) and the process is terminated. As a result, the content of the text buffer finally becomes "ABDEF↑GHIJK↑LMNOP↑QPR↑".

If the judgment in step ST13 is NO, the value of Pt is incremented by two (step ST15) and the process is terminated. A series of processes in steps ST9, ST13 and ST15 correspond to the processes in steps ST) and ST10 in the flowchart shown in FIG. 9.

If in step ST8, C(Pt+1) is a line feed code (YES in ST8), the process is terminated. This process prevents a line feed code inputted by a user from being deleted when an original body of text prepared by the user is, for example, "ABDEF↑GHIJK↑↑LMNO↑QPR↑", as shown in FIG. 15A and includes two consecutive line feed codes.

Specifically, if "D" is deleted from a body of text "ABDEF↑GHIJK↑↑LMNO↑QPR↑", shown in FIG. 15A, the content of the text buffer becomes "ABEF↑GHIJK↑↑LMNO↑QPR↑", as shown in FIG. 15, and the CPU 5 executes the processes in the flowchart shown in FIG. 13. Then, "G" is replaced with "↑" (line feed code shift 1) in the process in step ST9, and the content of text buffer becomes "ABEFG↑HIJK↑↑LMNO↑QPR↑", as shown in FIG. 15C.

Then, in step ST5, it is judged that a line feed code following a character code "K" is C(Pt). At this point, Pt=10 and PL=4 hold true. Therefore, in step ST7, it is judged that PL=Pg-1 holds true, and the flow proceeds to step ST8. Since in step ST8, Pt+1=11 results, C(Pt+1), that is, the eleventh code in the text buffer is judged to be a line feed code (YES in ST8) and the process is terminated.

In this way, in the flowchart shown in FIG. 13 consecutive line feed codes intentionally inputted by a user are not deleted and stored.

Although in this example, the value of line end position information Pg is set to "5", it is not limited to this value, and it can also be set to any predetermined value. Alternatively, when text data is read in the file 4, a maximum line end position or the line end position that most frequently appears can be used as line end position information Pg.

<<High-speed Editing Process>>

Next, a high-speed editing process is described.

This process aims to improve process speed by temporarily interrupting an editing process, recording unprocessed lines that have a special mark, etc., attached to them, starting a new editing process from the beginning and for unprocessed lines, collectively executing editing processes together with the new process when there is another insertion or deletion while the editing process is executed after an insertion or deletion.

Figure 16:
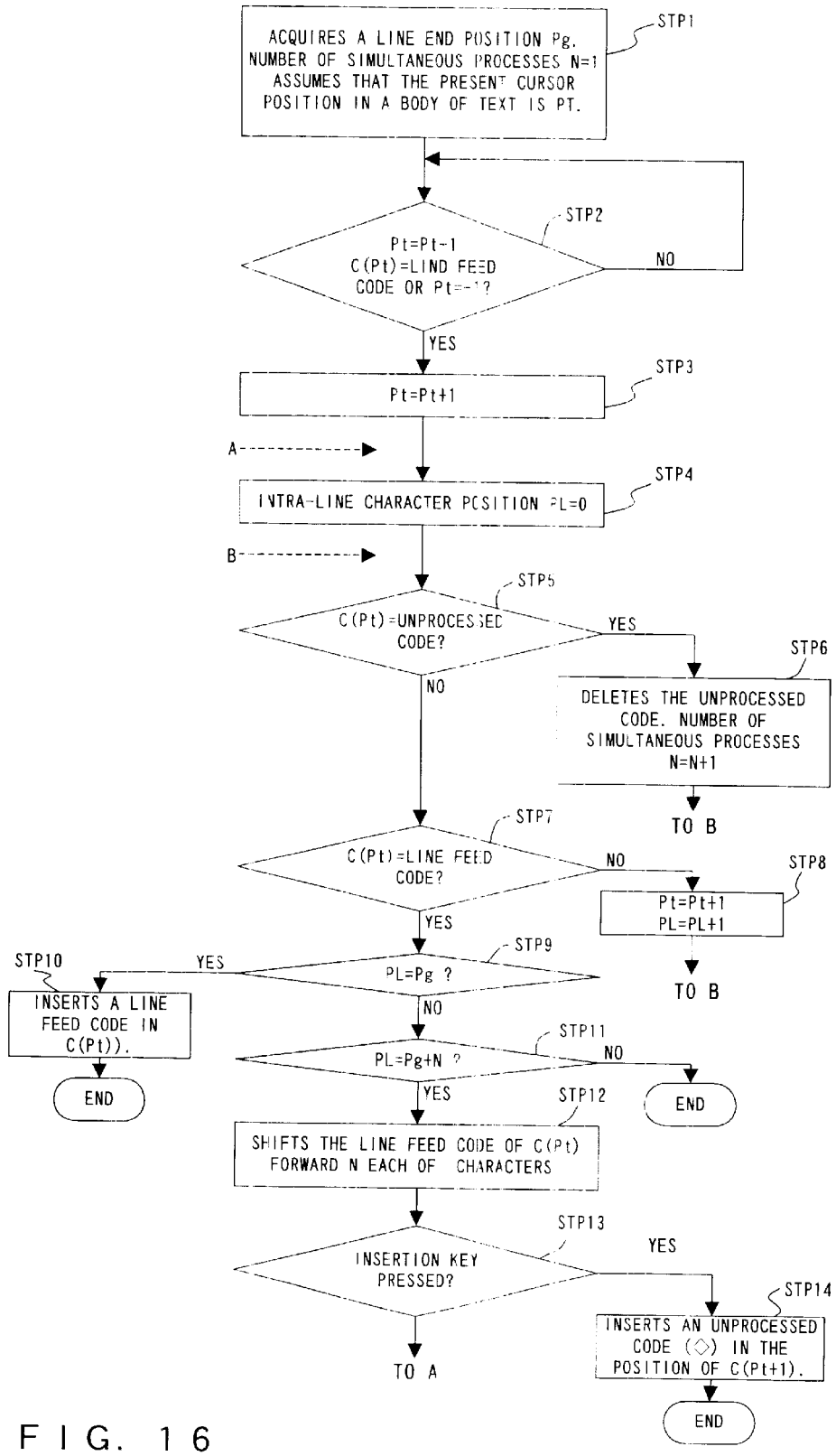
FIG. 16 is a flowchart showing a high-speed process after insertion.

FIG. 16 is a flowchart showing this process. FIG. 17 is a concrete example of this process. The processes in the flowchart shown in FIG. 16 is described below with reference to FIG. 17. In the following description of the flowchart shown in FIG. 16, as shown in FIG. 17A, the original body of text (text data) is assumed to be "ABCDE↑FGHIJ↑KLMNO↑PQR↑". If "X" is inserted between "B" and "C" of this original text, the content of the text buffer becomes "ABXCDE↑FGHIJ↑KLMNO↑PQR↑", as shown in FIG. 17B, and the CPU 5 executes the processes in the flowchart shown in FIG. 16.

The main differences between the flowchart shown in FIG. 16 and the flowchart shown in FIG. 3 are the setting of the number of simultaneously handled processes to a variable N in step STP1, the existence/non-existence judgment of an unprocessed code in step STP5, the insertion process of an unprocessed code in the case where an insertion key is operated in step STP14, etc.

The concrete processes in the flowchart shown in FIG. 16 are described below.

First, line end position information Pg is acquired and the present cursor position in the text buffer is set to Pt (STP1). The number of processes simultaneously handled N is set to "1" (STP1). In the example shown in FIG. 17A, Pg and Pt are set to 5 and 3, respectively.

If C(Pt)=line feed code or Pt=−1 does not hold true (NO in STP2), the process in step STP2 is repeated until C(Pt)= line feed code or Pt=−1 results. This process is used to search for the head of a line in which a character is inserted. In the example shown in FIG. 17, the process in step STP2 is repeated three times, and it is judged that Pt=−1 holds true (YES in STP2). Then, the value of Pt is incremented by one (STP3). As a result, Pt becomes 0, which indicates the leading character code "A" in the text buffer.

Then, the value of an intra-line character position PL is set to "0" (STP4).

Then, in this example, it is judged whether C(Pt)= unprocessed code holds true, specifically, whether the Pt-th code in the text buffer is an unprocessed code (STP5). This unprocessed code is inserted in the text buffer if a new code is inserted by operating an insertion key while the editing process of the previous insertion is executed. The insertion process of the unprocessed code is described later.

If C(Pt) is not an unprocessed code (NO in STP5), the same process as the process used after insertion or deletion described above is executed. Specifically, the detection process of a line feed code is executed (STP7), and both the value of the present cursor position Pt and the value of an intra-line character position PL are incremented by one until a line feed code is detected (STP8). Then, if C(Pt) is judged to be a line deed code (YES in STP7), the value of the intra-line character position PL and the value of the line end position Pg are compared, and it is judged whether the values match (STP9).

If both the values match (YES in STP9), as a result of a line feed code shift, it is judged that the number of characters of a line in a process equals the line end position Pg, but a character is not shifted to the next line, and a line feed code is inserted in C(Pt) to terminate the process (STP10). If both the values do not match (NO in STP9), it is judged whether the value of the intra-line character position PL matches a value obtained by adding N to the line end position Pg (STP11). If they do not match, it is judged that a line feed code shift is made, but the number of characters of the line in a process remains fewer than the line end position Pg, and that a character is not shifted to the next line to terminate the process (NO in STP11).

If a character is inserted in a specific line, a line feed code shift process for modifying the position of a line feed code while shifting characters is executed. The termination condition for the line feed code shift is the detection of a line with five or less of characters after the shift of the character from the preceding line. Since in a state where an unprocessed code is not inserted in the text buffer, the line feed code shift process is executed in order from a line in which a character is inserted in the same way as in the flowchart shown in FIG. 3. The maximum number of characters per line is six even if the number of characters per line is increased due to the line feed code shift. Thus, in step STP11 it is judged that for a line with six or more characters after the line feed code shift, PL=Pg+1 holds true (YES in STP11), and the flow proceeds to step STP12.

In step STP12, the line feed code in C(Pt) is shifted forward N characters in the text buffer. Specifically, a line feed code shift process for replacing C(Pt) with C(Pt−N) is executed. In this case, since N=1 holds true, C(Pt) is replaced with C(Pt−1). Then, the value is modified to Pt−N+1. In this case, since N=1 holds true, the value of Pt does not change, and Pt is replaced with a line feed code to indicate the head of the character code shifted to the head of the line.

In the example shown in FIG. 17, such a line feed code shift process is executed twice (line feed code shift 1 and line feed code shift 2) as shown in FIGS. 17C and 17D. As a result, the content of the text buffer becomes "ABXCD↑EFGHI↑JKLMNO↑PQR".

Then, it is judged whether a new insertion key is pressed (STP13). If a new insertion key is not pressed (NO in STP13), the flow returns to step STP4, the intra-line character position PL is reset to "0" in the same way as described above, and the same process is repeated. If a new insertion key is pressed (YES in STP13), an unprocessed code (◇) is inserted in a position following C(Pt), that is, in the position of C(Pt+1) (STP14) to terminate the process.

In the example shown in FIG. 17, after a line feed code shift process 2 is executed in step STP11, in step STP12 the pressing-down operation of the insertion key is detected, and in step STP14 an unprocessed code (◇) is inserted in the position of C(Pt+1) of the text buffer and the content of the text buffer becomes "ABXCD↑EFGHI↑◇JKLMNO↑PQR↑", as shown in FIG. 17E. As a result,it is recorded that there was an insertion process of a new character code "Y" in the text buffer before text editing based on the insertion of a character code "X" was completed.

Then, the character code is inserted in the relevant position of the text buffer by the above-described insertion key operation, and the process in the flowchart shown in FIG. 16 is executed by the CPU 5. In the example shown in FIG. 17, "Y" is inserted between "X" and "C" in the first line of the text, and after the content of the text buffer becomes "ABXYCD↑EFGHI↑◇JKLMNO↑PQR↑", as shown in FIG. 17E, the processes in the flowchart shown in FIG. 16 is restarted.

As a result, the same line feed code shift as described above is again performed from the first line of the body of text. In the example shown in FIG. 17, both a line feed code shift 1 and a line feed code shift 2 are performed as shown in FIGS. 17F and 17G. Then, when the line feed code shift processes are performed for the third line "I◇JKLMNO↑" of the body of text and when the value of Pt becomes 13, in step STP5 it is judged that C(Pt) is an unprocessed code (YES in STP5). Then, in step STP6, an unprocessed code C(11) is deleted from the text buffer, and the value of N is incremented by one. As a result, the content of the text buffer becomes "ABXYC↑DEFGH↑IJKLMNO↑PQR↑", as shown in FIG. 17H. Specifically, the positions of codes in which Pt=14 holds true, in the text buffer are shifted backward one character. The value of N becomes 2.

After the process in step STP6, the process in step STP5 is executed again. Since in the example shown in FIG. 17, only "Y" is inserted, judgment in step STP5 becomes NO, and the flow proceeds to step STP7. In step STP7, it is judged whether C(Pt) equals a line feed code. If C(Pt) does not equal a line feed code (NO in STP7), the flow returns to step STP5.

In this way, in a specific line sandwiched in between two line feed codes the process in step STP6 is executed the same number of times as the number of unprocessed codes in the line, a number obtained by adding 1 to the number of the unprocessed codes is set to N, and simultaneously the unprocessed codes are deleted from the text buffer. The following processes are the same as described earlier, and the final editing result is as shown in FIG. 17J.

By processing as described above, when a new insertion or deletion is processed before a text editing process after the previous insertion and deletion has been completed, both the text editing process accompanying the new insertion or deletion and the text editing process accompanying the previous insertion or deletion can be collectively processed, and thereby a high-speed text editing process can be realized.

The shift process executed by the line feed code position shift unit 3 can also be collectively processed using a special trigger. Specifically, by collectively executing text editing processes after a series of insertion or deletion processes for a body of text or using a special trigger, such as a collective line end modification key, an efficient and high-speed text editing process can be realized.

Furthermore, when in this first preferred embodiment, a character string including blanks at the head of a line is designated as a target to be shifted or copied, the character string can also be stored after deleting the leading blanks in the line, and the character string can be developed and processed according to the format of a target document.

If as a result of this text editing process, for example, a character that may not be first in a line, such as punctuation marks, etc., is to be shifted, the character is shifted to the end of the preceding line. If there is a character that may not be first in a line in a special line end position and line feed is performed immediately after the character, the character can be judged to be located at the end of the line.

The Second Preferred Embodiment

Next, the second preferred embodiment of the present invention is described.

Figure 18:
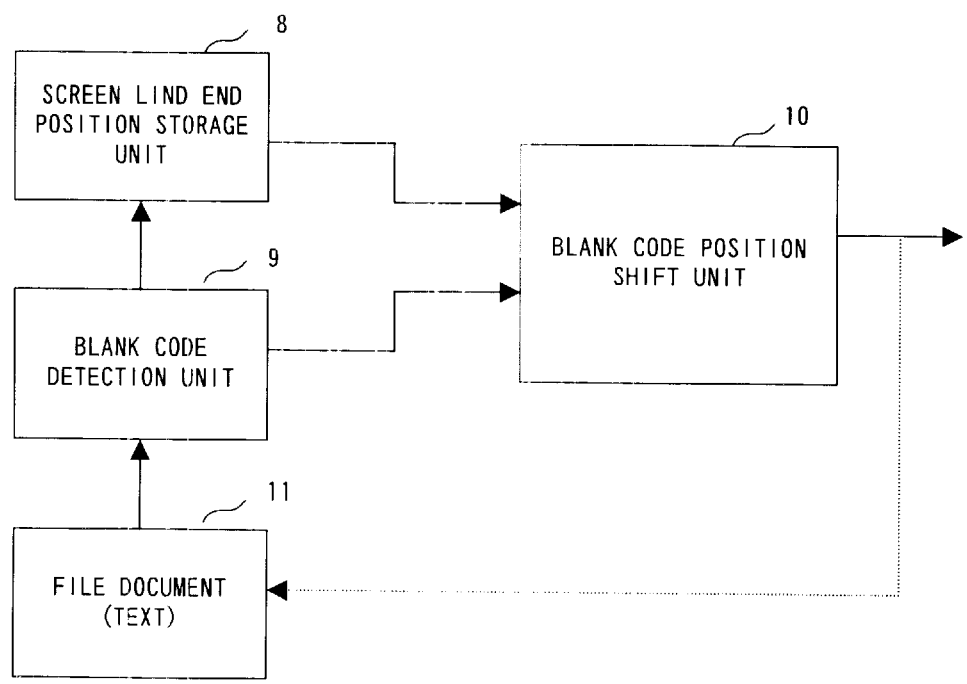
FIG. 18 shows the configuration of a text editing system in the second preferred embodiment.

This preferred embodiment relates to a text editing system with an indentation function, and FIG. 18 shows the basic configuration of this preferred embodiment.

An indentation function is a function to change the starting and ending positions of a line.

In FIG. 18, a screen line end storage unit 8 stores the number of characters per line of a screen, and registers a predetermined value according to the screen size, etc., of a display. A blank code detection unit 9 detects a blank code in a body of text. The blank code detection unit 9 refers to a document (text) written in a file 11, and detects a blank code in each line. A blank code position shift unit 10 shifts the position of a blank code in such a way that a prescribed number of blank codes can be located at the head of a line based on both the position information of a blank code detected by the blank code detection unit 9 and information Lg about the number of characters per line of a screen. For example, if a character code is located at the head of a specific line and a prescribed number of blank codes continue immediately after the character code, the blank code position shift unit 10 shifts the character code immediately after the prescribed number of blank codes, and edits lines in such a way that the prescribed number of blank codes can be located at the head of the line. If a blank code is located at the end of a line and a character code is located at the head of the next line, the blank code position shift unit 10 replaces the character code with the blank code, and shifts the position of the blank code to the head of the line.

The text editing process in this preferred embodiment is clearly described below using a flowchart. The text editing process in this preferred embodiment is also divided into an <<editing process after insertion>> and an <<editing process after deletion>>.

<<Editing Process After Insertion>>

First, the editing process after insertion is described.

Figure 20:
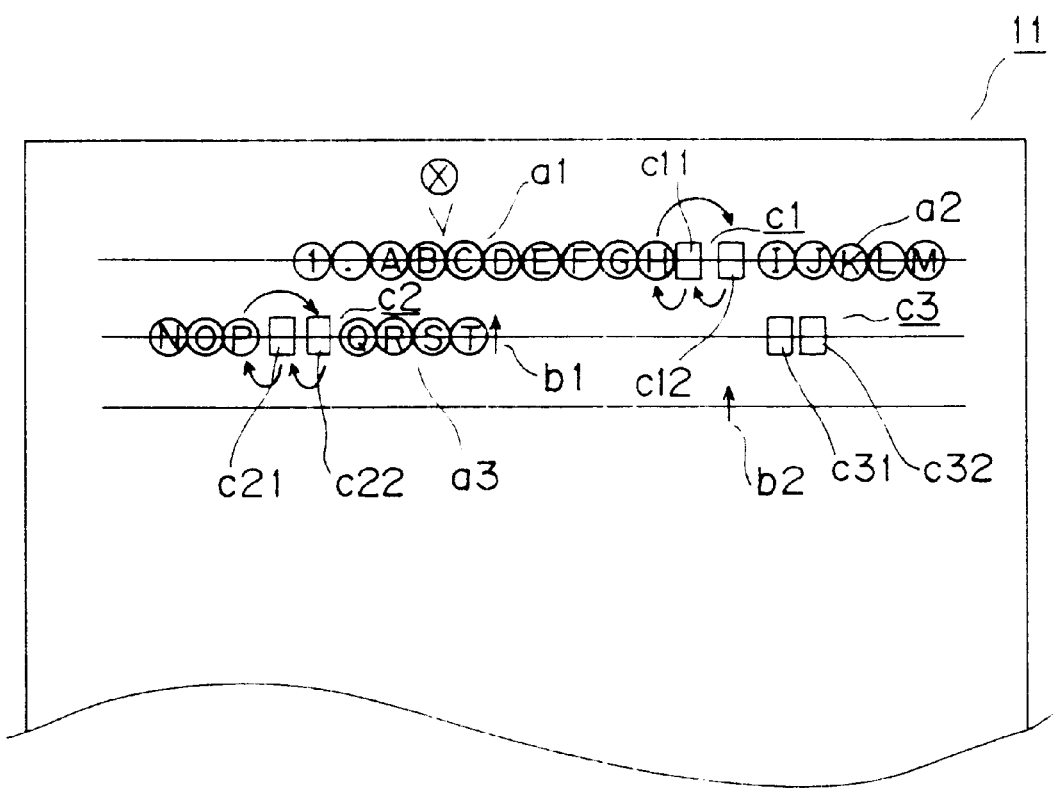
FIG. 20 shows the data structure of a file.

FIG. 19 is a flowchart showing an editing process after insertion in this preferred embodiment. It is assumed that for example, one page of text data is written in the file 11 shown in FIG. 18 prior to the commencement of the process shown in FIG. 19. Real text information is a code string in which character codes and line feed codes continue, and the information is stored in the file 11, for example, in the data format shown in FIG. 20. In FIG. 20, a1, a2, a3, . . . , b1, b2, b3, . . . and c1, c2, c3, . . . indicate character strings, line feed codes and blank code strings, respectively. In FIG. 20, each blank code string c1, c2, c3, . . . is composed of two blank codes, specifically, blank codes C11 and C12, C21 and C22, and C31 and C32, respectively.

Figure 21:
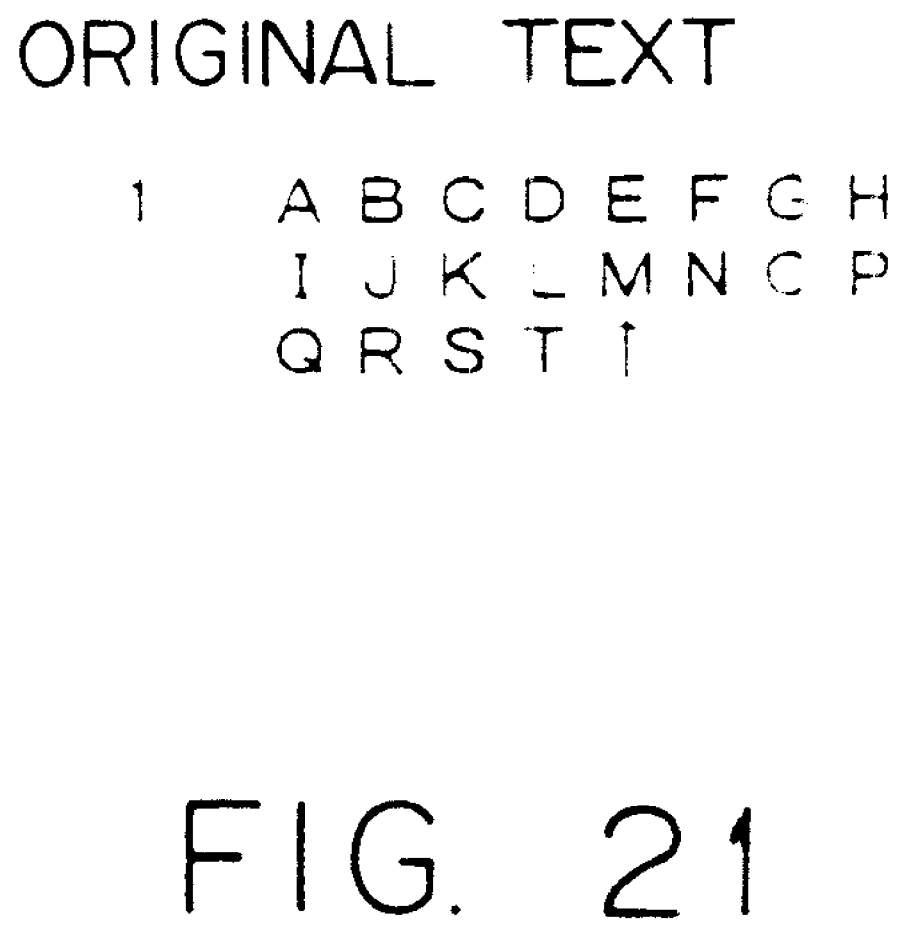

FIG. 20 shows text data (an original text) in the file 11 used in the following description. This original text is "1. ABCDEFGH IJKLMNOP QRST↑", and since in this preferred embodiment the number of characters per line of the screen of a display 5c is 10, the original text is displayed in the following format on the screen of the display 5c as shown in FIG. 21.

1. ABCDEFGH
   IJKLMNOP
   QRST↑

A line feed code (↑) is not actually displayed.

The processes in the flowchart shown in FIG. 19 are described using the original text shown in FIG. 22 as a concrete example with reference to FIG. 22. If in a state where the original text shown in FIG. 22A is displayed on the screen of the display 5c, a cursor is moved to "C" in the first line and "X" is inserted between "B" and "C", the content of a text buffer is rewritten to "1. ABXCDEFGH IJKLMNOP QRST↑", and a CPU 5 executes the processes in the flowchart shown in FIG. 19.

In the flowchart shown in FIG. 19, first, a screen line end Pg is acquired (W1). The value of the screen line end Pg is stored in the above-described screen line end storage unit 8 and the screen line end Pg is acquired from the screen line end storage unit 8. In this example it is assumed that "10" is read as the screen line end Pg in the first process (W1). In the process (W1), the position of a character code which is indicated by the cursor in the document (text) simultaneously written in the text buffer is set in Pt (W1).

In this example, the position "3" in the character code text buffer of "C" is set in Pt. Then, the value of Pt is decremented by one, and it is judged whether C(Pt) is a line feed code or the value of Pt is −1 (W2). This process is basically the same as the process described in the first preferred embodiment described above. In this example, the value of Pt moves from 3 to "2"→"1"→"0"→"−1" and it is judged that the value of Pt is −1 (YES in W2). If a character code is inserted in the second or subsequent lines of the text buffer, a line feed code can be detected.

Then, Pt is incremented by one, and it is judged whether C(Pt)=line feed code holds true (W3). The process in step W3 is a process for judging the completion of the editing process of the original body of text, and corresponds to the detection process of a line feed code b1 shown in FIG. 20. If a line feed code is detected in the process in step W3 (YES in W3), the process is terminated.

If judgment in step W3 becomes NO, it is judged whether Pt is a multiple of Pg (W4). The process in step W4 is a process for detecting the code at the head of the next line. If judgment in step W4 becomes NO, the flow returns to step W3. In this example, Pt is incremented in order, and a corresponding code C(Pt) changes in the order of "1"→"A"→"B".

Then, if it is judged that Pt is a multiple of a screen line end Pg (YES in W4), it is judged whether C(Pt) is a blank code (W5). Specifically, in the example shown in FIG. 22, the value of Pt is 13 and C(Pt)=character code "H." holds true. Therefore, judgment in step W4 becomes NO and the flow proceeds to step W6.

If "X" is inserted between character codes "B" and "C", as shown in FIG. 22, the last character code "H" in the first line of the original text is shifted to the head of the second line, as shown in FIG. 22B. Since the Pt of the leading character code in the text buffer is 0, the fact that the value of Pt is a multiple of Pg means that Pt is a pointer value indicating the leading code of each line in the text. Therefore, in this example, in step W5, C(Pt) character code "H" holds true, and it is judged that C(Pt) is not a blank code (NO in W5).

In step W6, Pt is incremented by one, and it is judged whether the next code C(Pt) is a line feed code (W6). The case in which at this time, C(Pt) is a line feed code (YES in W6), is described later.

If in the judgment (W6) the next code C(Pt) is not a line feed code (NO in W6), the number of indentation M is set to "1", and it is judged whether character information C(Pt) is a blank code (W7). Specifically, it is judged whether a blank code exists immediately after a character code "H", as shown in FIG. 22. If in step W7 it is judged that C(Pt) is a blank code (YES in W7), the flow proceeds to step W8. In step W8, the value of Pt is incremented by one, and it is judged whether C(Pt)=blank code holds true (W9). Then, if in step W9 it is judged that C(Pt) is a blank code (YES in W9), the value of a variable M indicating the number of indentations is incremented by one (W10), and the flow returns to step W8.

In the processes of steps W7 through W9, the number of indentations (number of indented characters) of the original text is obtained. In the example shown in FIG. 22, the number of indentations is 2. Therefore, in the example shown in FIG. 22, the processes in steps W8 through W10 are repeated twice. When the value of Pt becomes 13, judgment in step W9 becomes NO, and the flow proceeds to step W11.

In the process of step W11, the character code in C(Pt−M−1) is replaced with the blank code in C(Pt−1). In the example shown in FIG. 22, at this time the number of indentations M is "2", and a character code "H" is replaced with the second blank code from the character. As a result, in the example shown in FIG. 22, the content of the text buffer is rewritten as "1. ABXCDEFG HILKLMNOP QRST↑".

When the process in step W11 is completed, the flow returns to step W3 again, and the same process as described above is executed for a code string "IJKLMNOP Q" in the text buffer this time. As a result, in the second process of step W11, a character code "P" is replaced with the second blank code from the character. As a result, the content of the text buffer becomes "1. ABXCDEFG HIJKLMNO PQRST↑". At this time, the value of Pt is 23.

After step W11 the flow returns to step W3, the processes in steps W3 and W4 are repeated for a code string "QRST↑" in the text buffer. When the value of Pt becomes 37, in step W3 it is judged that C(Pt) equals a line feed code, and the process is terminated.

FIG. 22C shows a state in which the text editing process of this example has been completed. FIG. 22C shows an editing result obtained by executing the test editing process of the example when "X" is inserted in the original text data shown in FIG. 22A. FIG. 22B shows an example of the conventional test editing process. In the conventional case, character codes "H" and "P" are located at the head of the next lines by the insertion of a character code "X". In this example, since the characters "H" and "P" are replaced with the relevant blank code (W11) after insertion, the position of the blank codes can be fixed in the same way as in the original text. Therefore, a document with both high operability and indentation can be composed by adopting the text editing system in this preferred embodiment.

FIG. 23 shows an example of the process for realizing an indentation function by inserting the same number of blank codes as the number of indentations in a new line in the case where as a result of the position shift of the blank code in this preferred embodiment a new line is created. This process is realized in the process in step W12 in the flowchart shown in FIG. 19. As shown in FIG. 23A, if the content of an original text buffer is "1. ABCDEFGH IJKLMNOP QRSTUVWX↑" and if "X" is inserted between "B" and "C" of the character string "ABCDEFGH", the content of the text buffer is modified to "1. ABCXDEFGH IJKLMNOP QRSTUVWX↑". In this case, in the last character code "X" in the text buffer, Pt=30 holds true. Thus, after the content of the text buffer is modified to "1. ABCXDEFG HIJKLMNO PQRSTUVWX↑" by the CPUs 5 execution of the processes in the flowchart shown in FIG. 19, in step W3 the value of Pt is set to 30 and it is judged that C(Pt) does not equal a line feed code (NO in W3). Then, in step W4 it is judged that Pt is a multiple of Pg (YES in W4). In step W6 the value of Pt is set to 31 and it is judged that C(Pt) is a line feed code (YES in W6). Then, the flow proceeds to W12. In step W12, M each of blank codes are inserted immediately before the character code in C(Pt−1), and the process is terminated.

Since Pt−1=30 holds true in the process of step W12, C(Pt−1) is a character code "X". As a result, as shown in FIG. 23B, two blank codes are located immediately before the character code "X" in the fourth line.

In this way, even if there is no blank code in an original body of text and if a new line is created by the insertion of a character, a necessary number of blank codes are automatically created at the head of the new line, and thereby the heads of the second line and after can be aligned in a text editing process.

Although a screen line end Lg is assumed to be "10" in the description of this preferred embodiment, it is not limited to "10". The number of blank codes at the head of a line is not limited to two, and it can be one, or three or more.

<<Editing Process After Deletion>>

FIG. 24 is a flowchart showing the editing process after deletion. In the description of this process, it is also assumed that for example, one page of text data (an original text) is written in the file 11 prior to the commencement of a text editing process. Real text information is a series of character codes and line feed codes, and for example the text is stored in the file 11 and in the data format shown in FIG. 25. In FIG. 25, a1, a2, a3, . . . , b1, b2, b3, . . . , and c1, c2, c3, . . . , indicate character code strings, line feed codes and blank code strings, respectively, in the same way as in FIG. 20.

The processes in the flowchart shown in FIG. 24 are described below with reference to FIG. 26. It is assumed that the text (original text) of the file 11 is downloaded to a text buffer, and when the content of the text buffer is "1. ABCDEFGH IJKLMNOP Q", "C" is deleted, as shown in FIG. 26A. It is also assumed that when the content of the text buffer becomes "1. ABCDEFGH IJKLMNOP Q", as shown in FIG. 26B, the CPU 5 executes the processes in the flowchart shown in FIG. 24.

As can be easily understood from comparison with and reference to the flowchart shown in FIG. 24 and the flowchart shown in FIG. 19, the flowcharts shown in FIGS. 19 and 24 share many common steps. The different steps are steps V4, and V10 through V12.

Since a character is shifted backward in the case of character deletion, as shown in FIG. 26C, after character deletion the end of each line becomes a blank code, and the number of blank codes at the heads of the second line and after decreases by one. Thus, as shown in FIGS. 26C and 26D, a process for replacing a blank code at the end of a line with a character code at the head of the next line is needed, as shown in FIGS. 26C and 26D.

In step V4, it is judged whether Pt equals a multiple of (Pg-1) and the end position of each line is detected. If judgment in step V4 is YES, it is judged whether C(Pt)= blank code holds true or whether the end position of each line is a blank code (V5). If judgment in step V5 is YES, 1 is set to a variable M. A variable M is used to count the number of indentations (V6). Then, the value of Pt is incremented by one (V7), and it is judged whether C(Pt) is a blank code (V8). If C(Pt) is a blank code (YES in V8), the value of M is incremented by one (V9), and the flow returns to step V7 again. In the loop processes in steps V7 through V9, the number of indentations is counted in the same way as in the loop processes of steps W8 through W10 in the flowchart shown in FIG. 19, and the count value is set to the variable M. In this example, the number of indented blank codes between every two lines which are shifted due to character deletion is counted.

If in step V8 it is judged that C(Pt) is not a blank code (NO in V8), the character code in C(Pt) is replaced with the blank code in C(Pt-M) (V10). This process in step V10 corresponds to the character shifts 1 and 2 shown in FIGS. 26C and 26D, and the character coded at the head of the line is replaced with a blank code at the end of the preceding line. In FIGS. 26C and 26D, the values of Pt are 11 and 21, respectively, and a character code "I" in the second line and a character code "Q" in the third line, respectively, are replaced with a blank code at the end of the preceding line.

When the process in step V10 has been completed, it is judged whether C(Pt+1) is a line feed code (V11). In this process in step V11 it is judged whether the line feed code which is the last code of the original text, is shifted to the head of a line. Specifically, as shown in FIG. 26D, as a result of character shift 2, it is judged that the last line feed code of the text is shifted to the head of a line. In such a case, since there is only a line feed code in the last line, of the body of text, there is no need for an indented blank code.

For this reason, if in step V11 it is judged that C(Pt+1) is a line feed code (YES in V11), M each of blank codes immediately before C(Pt+1) are deleted (V12). As a result, in the example shown in FIG. 26, two blank codes each at the end of the second line and at the head of the third line are deleted in the text buffer shown in FIG. 26D. Thus, in FIG. 26D, a character code "Q" is shifted to the second line, and as a result, a line feed code (↑) located in the second position of the third line is shifted to the head of the third line.

When the process in step V11 is completed, the flow returns to step V3. In the process in step V3, the line feed code which is the last code of the text is detected. In the example shown in FIG. 26, since the value of Pt is 19 when in step V12 the content of the text buffer is modified to the content shown in FIG. 25D, in step V3 the value of Pt is incremented by one and the value becomes 20. Thus, it is judged that C(Pt)=line feed code holds true (YES in V3), and the process is terminated.

As a result, the content of the text buffer finally becomes "1. ABDEFGHI JKLMNOPQ↑", as shown in FIG. 26E.

Although in the description of this example, a screen line end Lg is also assumed to be "10", it is not limited to "10". The number of blank codes at the head of a line is not be limited to 2, and it can also be one or three or more.

Furthermore, when in each example of the second preferred embodiment, a character string including blanks at the head of a line is designated as a target to be shifted or copied, the blank codes at the head of the line can also be deleted and the character string can be stored without the blank codes at the head of the line. When the character string is developed, it can be processed according to the format of a document to be developed.

The above-described first and second preferred embodiments can also be combined and implemented.

For example, although in each example of the second preferred embodiment the ends of lines are aligned based on the number of characters per line of a screen, the ends of lines of a body of text can also be aligned utilizing the number of characters per line stored in the line end position storage unit 1 instead of the number of characters per line of a screen if the ends of lines are aligned utilizing a line feed code.

The heads of lines can also aligned utilizing tub codes instead of blank codes. If a line beginning with a special code is inserted in an original body of text, the number of indented blanks can also be changed according to the type of the special code in the insertion line. The special code includes, for example, a code indicating the starting point of itemized sentences, a code string consisting of a code indicating a numeric character and a code indicating separation, a code indicating a centered period (e), etc.

In a specific range of a body of text, the ends of lines can also be aligned by designating at least one special line end position, aligning all lines with the special line position and collectively adjusting the number of blanks at the left ends.

FIG. 27 shows a system for realizing the text editing process of the present invention by recording a program for the test editing system of the present invention in a storage medium 15, such as a floppy disk, CD-ROM, etc., and inserting the storage medium 15 in the drive 21 of a computer 20. The text editing process of the present invention can also be realized by downloading the program from a program provider 30 to the computer 20 through a network, such as the Internet, LAN, WAN, etc.

As described above, according to the text editing system of the present invention, the line end position of a body of text can be set utilizing the position of a line feed code, and even if an insertion or deletion is performed, the right end can always be set to the line end position by securing the position of a line feed code, thereby enabling generalized text editing.

Therefore, in a business world, for example, where personal computer communications and electric mail play important roles, a body of text with excellent portability, which is an important factor, can be provided.

If there is a blank code at the head of a line, in a text editing process after insertion or deletion is performed, a body of text is automatically edited in such a way that the same number of blank codes as those in the original body of text can be located at the head of the line, thereby enabling a flexible indentation function. According to such a configuration, a prescribed number of blank codes are automatically and permanently located at the head of each line, thereby enabling the high operability of a process, such as insertion and deletion in a body of text.

What is claimed is:

1. A text editing system for editing a body of text in which one or a plurality of prescribed blank codes are fixed in location, comprising:

screen line end position storing means for storing a screen line end position;

blank code detecting means for detecting a blank code in a body of text;

character code counting means for counting a number of character codes located from a head of a text until immediately before a first blank code detected by the blank code detecting means or a number of character codes located between two blank codes detected by the blank code detecting means; and blank code position shifting means, when the number of character codes counted by the character code counting means is greater than the number of character codes per line of a screen, for locating the prescribed number of blank codes at a head of the line by replacing a position of a blank code detected by the blank code detecting means with a position of a character code located immediately before the blank code.

2. The text editing system according to claim 1, wherein when as a result of a position shift process of a blank code and a character code, a character code is shifted to a new line, the said blank code position shifting means creates the prescribed number of blank codes to be located immediately before the character code at a head of the new line.

3. The text editing system according to claim 1, wherein said blank code position shifting means collectively executes processes using a special trigger.

4. The text editing system according to claim 1, which when a character string including a blank code at a head of a line as a target to be shifted or copied, deletes the blank code, stores the string after it is deleted and develops the string in a required data format.

5. A text editing system for editing a body of text in which one or a plurality of prescribed blank codes are fixed in location, comprising:

screen line end position storing means for storing a screen line end position;

blank code detecting means for detecting a blank code in a body of text;

character code counting means for counting a number of character codes located from a head of a body of text until immediately before a first blank code detected by the blank code detecting means or a number of character codes located between two blank codes detected by the blank code detecting means; and blank code position shifting means, when the number of character codes counted by the character code counting means is smaller than the number of character codes per line of a screen, for locating a prescribed number of blank codes at a head of a line by replacing a position of a blank code detected by the blank code detecting means with a position of a character code located immediately after the blank code.

6. The text editing system according to claim 5, wherein when as a result of a shift process a line consisting of only blank codes is created, said blank code position shifting means deletes the blank codes.

7. A text editing method for editing a body of text in such a way that the left end of each line is aligned and a number of characters of each line is within a prescribed number of characters, comprising:

storing a line end position;

detecting line feed codes in a body of text;

counting a number of character codes located from a head of the body of text up to immediately before the first code detected or a number of character codes located between two line feed codes; and when the number of character codes counted and the line end position do not match, shifting a position of a latest line feed code detected to immediately after the line end position, and, when the number of character codes from the head of the body of text up to immediately before the first line feed code or the number of character codes between two line feed codes is made greater by n characters than a value of the line end position by inserting at least one character in the text, shifting the position of the latest line feed code to the left n characters, where n is a positive integer, so that the latest line feed code appears earlier in the body of text.

8. A text editing method for editing a body of text in which one or a plurality of prescribed blank codes are fixed in location, comprising:

storing a screen line end position;

detecting a blank code in a body of text;

counting a number of character codes located from a head of a body of text up to immediately before a first blank code or a number of character codes located between two blank codes detected in the body of text; and when a number of character codes counted is greater than the number of character codes per line of a screen, locating a prescribed number of blank codes at a head of a line by replacing a position of a blank code detected in the body of text with a position of a character code located immediately before the blank code.

9. A text editing method for editing a body of text in which one or a plurality of prescribed blank codes are fixed in location, comprising:

storing a screen line end position;

detecting a blank code in a body of text;

counting a number of character codes located from a head of a body of text up to immediately before a first blank code or a number of character codes located between two blank codes detected in the body of text; and when the number of character codes counted is smaller than a number of character codes per line of a screen, locating a prescribed number of blank codes at a head of a line by replacing a position of a blank code detected in the body of text with a position of a character code located immediately after the blank code.

10. A computer-readable storage medium on which is recorded a program for enabling a computer to perform a method comprising:

storing a line end position;

detecting a line feed code in a body of text;

counting a number of character codes from a head of the body of text up to immediately before a first line feed code detected or a number of character codes between line feed codes detected; and when the number of character codes counted and the line end position do not match, shifting a position of a latest line feed code detected to immediately after the line end position, and, when the number of character codes from the head of the body of text up to immediately before the first line feed code or the number of character codes between two line feed codes is made greater by n characters than a value of the line end position by inserting at least one character in the text, shifting the position of the latest line feed code to the left n characters, where n is a positive integer, so that the latest line feed code appears earlier in the body of text.

11. A computer-readable storage medium on which is recorded a program for enabling a computer to function, comprising:

storing a screen line end position;

detecting a blank code in a body of test;

counting a number of character codes from a head of a body of text to immediately before a first blank code or a number of character codes between two blank codes detected in the body of text; and when the number of character codes counted is greater than the number of character codes per screen line, locating the prescribed number of blank codes at a head of the line by replacing a position of a blank code detected in the body of text with a position of a character code located immediately before the blank code.

12. A computer-readable storage medium on which is recorded a program for enabling a computer to function, comprising:

storing a screen line end position;

detecting a blank code in a body of text;

counting a number of character codes located from a head of a body of text up to immediately before a first blank code or a number of character codes located between two blank codes detected in the body of text; and when the number of character codes counted is smaller than a number of character codes per line of a screen, locating a prescribed number of blank codes at a head of a line by replacing a position of a blank code detected in the body of text with a position of a character code located immediately after the blank code.

13. A document editing system for editing a text document, comprising:

counting means for counting a number of character per line in a document; and text editing means, when a character is inserted in or deleted from a specific line in a body of text during editing, for editing a line by shifting a number of the characters inserted in the line to a next line or acquiring a number of the characters deleted from the line from a next line while maintaining the same number of characters in the line.

14. A document editing system for editing a text document, comprising:

counting means, when a character is inserted in or deleted from a specific line in a body of text during editing, for counting a number of blank codes at a head of a next line; and editing means for editing a line by shifting a number of the characters inserted in the line to a next line or acquiring a number of the characters deleted from the line from a next line while maintaining both the same number of characters and the same number of blanks at a head of the next line.

15. A text editing system for editing a body of text in such a way that a left end of each line is aligned and a number of characters of each line is within a prescribed number of characters, comprising:

line end position storing means for storing a line end position;

line feed code detecting means for detecting line feed codes in a body of text;

character code counting means for counting a number of character codes from head of the body of text up to immediately before a first code detected by the line feed code detecting means or a number of character codes between two line feed codes detected by the line feed detecting means; and line feed code position shifting means for shifting, when the number of character codes counted by the character code counting means and the line end position stored in the line end position storing means do not match, a position of a latest line feed code detected by the line feed code detecting means to immediately after the line end position, and for shifting, when the number of character codes from the head of the body of text up to immediately before the first code detected by the line feed code detecting means or the number of character codes between two line feed codes is made greater by n characters than a value of the line end position by inserting at least one character in the text, the position of the latest line feed code to the left n characters, where n is a positive integer, so that the latest line feed code appears earlier in the body of text.

16. A text editing system for editing a body of text in such a way that a left end of each line is aligned and a number of characters of each line is within a prescribed number of characters, comprising:

line end position storing means for storing a line end position;

line feed code detecting means for detecting line feed codes in a body of text;

character code counting means for counting a number of character codes from head of the body of text up to immediately before a first code detected by the line feed code detecting means or a number of character codes between two line feed codes detected by the line feed detecting means; and line feed code position shifting means for shifting, when the number of character codes counted by the character code counting means and the line end position stored in the line end position storing means do not match, a position of a latest line feed code detected by the line feed code detecting means to immediately after the line end position, and for shifting, when the number of character codes from the head of the text up to immediately before the first code detected by the line feed code detecting means or the number of character codes between two line feed codes is made smaller by n characters than a value of the line end position by deleting at least one character in the text, the position of the latest line feed code to the right n characters, where n is a positive integer, so that the latest line feed code appears later in the body of text.

17. A text editing system for editing a body of text in such a way that a left end of each line is aligned and a number of characters of each line is within a prescribed number of characters, comprising:

line end position storing means for storing a line end position;

line feed code detecting means for detecting line feed codes in a body of text;

character code counting means for counting a number of character codes from head of the body of text up to immediately before a first code detected by the line feed code detecting means or a number of character codes between two line feed codes detected by the line feed detecting means; and line feed code position shifting means for shifting, when the number of character codes counted by the character code counting means and the line end position stored in the line end position storing means do not match, a position of a latest line feed code detected by the line feed code detecting means to immediately after the line end position, and for shifting, when the number of character codes from the head of the body of text up to immediately before the first code detected by the line feed code detecting means or the number of character codes between two line feed codes is made greater by n characters than a value of the line end position by inserting at least one character in the text, the position of the latest line feed code to the left n characters, where n is a positive integer, so that the latest line feed code appears earlier in the body of text, and for inserting, when as a result of a position shift process of a line feed code, a number of characters of a specific line matches the line end position, a new line feed code immediately after the line.

18. A text editing system for editing a body of text in such a way that a left end of each line is aligned and a number of characters of each line is within a prescribed number of characters, comprising:

line end position storing means for storing a line end position;

line feed code detecting means for detecting line feed codes in a body of text;

character code counting means for counting a number of character codes from head of the body of text up to immediately before a first code detected by the line feed code detecting means or a number of character codes between two line feed codes detected by the line feed detecting means; and line feed code position shifting means for shifting, when the number of character codes counted by the character code counting means and the line end position stored in the line end position storing means do not match, a position of a latest line feed code detected by the line feed code detecting means to immediately after the line end position, and for shifting, when the number of character codes from the head of the body of text up to immediately before the first code detected by the line feed code detecting means or the number of character codes between two line feed codes is made greater by n characters than a value of the line end position by inserting at least one character in the text, the position of the latest line feed code to the left n characters, where n is a positive integer, so that the latest line feed code appears earlier in the body of text, and for inserting, when as a result of a position shift process of a line feed code, a number of characters of a specific line matches the line end position, a new line feed code immediately after the line and a compulsory line feed mark at least one of immediately before and immediately thereafter.

19. A text editing system for editing a body of text in such a way that a left end of each line is aligned and a number of characters of each line is within a prescribed number of characters, comprising:

line end position storing means for storing a line end position;

line feed code detecting means for detecting line feed codes in a body of text;

character code counting means for counting a number of character codes from head of the body of text up to immediately before a first code detected by the line feed code detecting means or a number of character codes between two line feed codes detected by the line feed detecting means; and line feed code position shifting means for shifting, when the number of character codes counted by the character code counting means and the line end position stored in the line end position storing means do not match, a position of a latest line feed code detected by the line feed code detecting means to immediately after the line end position, and for shifting, when the number of character codes from the head of the text up to immediately before the first code detected by the line feed code detecting means or the number of character codes between two line feed codes is made smaller by n characters than a value of the line end position by deleting at least one character in the text, the position of the latest line feed code to the right n characters, where n is a positive integer, so that the latest line feed code appears later in the body of text, and for deleting the line feed code when there is no need for a shifted line feed code.

20. A text editing system for editing a body of text in such away that a left end of each line is aligned and a number of characters of each line is within a prescribed number of characters, comprising:

line end position storing means for storing a line end position;

line feed code detecting means for detecting line feed codes in a body of text;

character code counting means for counting a number of character codes from head of the body of text up to immediately before a first code detected by the line feed code detecting means or a number of character codes between two line feed codes detected by the line feed detecting means; and line feed code position shifting means for shifting, when the number of character codes counted by said character code counting means and the line end position stored in said line end position storing means do not match, a position of a latest line feed code detected by said line feed code detecting means to immediately after the line end position, and interrupting a present position shift process of the latest line feed code, when a new position shift process is needed in mid-process of the present position shift process, to collectively execute the new position shift process and the present position shift process.

21. A text editing system for editing a body of text in such a way that a left end of each line is aligned and a number of characters of each line is within a prescribed number of characters, comprising:

line end position storing means for storing a line end position;

line feed code detecting means for detecting line feed codes in a body of text;

character code counting means for counting a number of character codes from head of the body of text up to immediately before a first code detected by the line feed code detecting means or a number of character codes between two line feed codes detected by the line feed detecting means; and line feed code position shifting means, when the number of character codes counted by the character code counting means and the line end position stored in the line end position storing means do not match, for shifting a position of a latest line feed code detected by the line feed code detecting means to immediately after the line end position, and interrupting a present position shift process of the latest line feed code and attaching an unprocessed mark to an interrupted point of the present position shift process, when a new position shift process is needed in mid-process of the present position shift process, to collectively execute the new position shift process and the present position shift process.

22. A text editing system editing a body of text in such a way that a left end of each line is aligned and a number of characters of each line is within a prescribed number of characters, comprising:

line end position storing means for storing a maximum line end position of a body of text;

line feed code detecting means for detecting line feed codes in the body of text;

character code counting means for counting a number of character codes from head of the body of text up to immediately before a first code detected by said line feed code detecting means or a number of character codes between two line feed codes detected by said line feed detecting means; and line feed code position shifting means for shifting, when the number of character codes counted by said character code counting means and the line end position stored in said line end position storing means do not match, a position of a latest line feed code detected by said line feed code detecting means to immediately after the line end position.

23. A text editing system editing a body of text in such a way that a left end of each line is aligned and a number of characters of each line is within a prescribed number of characters, comprising:

line end position storing means for storing a line end position that appears most frequently in a body of text;

line feed code detecting means for detecting line feed codes in the body of text;

character code counting means for counting a number of character codes from head of the body of text up to immediately before a first code detected by said line feed code detecting means or a number of character codes between two line feed codes detected by the line feed detecting means; and line feed code position shifting means for shifting, when the number of character codes counted by said character code counting means and the line end position stored in said line end position storing means do not match, a position of a latest line feed code detected by said line feed code detecting means to immediately after the line end position.

24. A text editing system editing a body of text in such a way that a left end of each line is aligned and a number of characters of each line is within a prescribed number of characters, comprising;

line end position storing means for storing a line end position of a first line of a body of text;

line feed code detecting means for detecting line feed codes in the body of text;

character code counting means for counting a number of character codes from head of the body of text up to immediately before a first code detected by said line feed code detecting means or a number of character codes between two line feed codes detected by the line feed detecting means; and line feed code position shifting means for shifting, when the number of character codes counted by said character code counting means and the line end position stored in said line end position storing means do not match, a position of a latest line feed code detected by said line feed code detecting means to immediately after the line end position.

25. A text editing system editing a body of text in such a way that a left end of each line is aligned and a number of characters of each line is within a prescribed number of characters, comprising:

string retrieval means for retrieving a string of text from a first line of a body of text;

line end position storing means for storing a line end position derived from a series of lines having a same line end position, the same line end position being stored in said line end position storing means as the line end position;

line feed code detecting means for detecting line feed codes in the body of text;

character code counting means for counting a number of character codes from head of the body of text up to immediately before a first code detected by said line feed code detecting means or a number of character codes between two line feed codes detected by the line feed detecting means; and line feed code position shifting means for shifting, when the number of character codes counted by said character code counting means and the line end position stored in said line end position storing means do not match, a position of a latest line feed code detected by said line feed code detecting means to immediately after the line end position.

26. A text editing system editing a body of text in such a way that a left end of each line is aligned and a number of characters of each line is within a prescribed number of characters, comprising;

line end position storing means for storing a line end position of a line immediately before a character is inputted;

line feed code detecting means for detecting line feed codes in a body of text;

character code counting means for counting a number of character codes from head of the body of text up to immediately before a first code detected by said line feed code detecting means or a number of character codes between two line feed codes detected by the line feed detecting means; and line feed code position shifting means for shifting, when the number of character codes counted by said character code counting means and the line end position stored in said line end position storing means do not match, a position of a latest line feed code detected by said line feed code detecting means to immediately after the line end position.

27. A text editing system editing a body of text in such a way that a left end of each line is aligned and a number of characters of each line is within a prescribed number of characters, comprising:

line end position storing means for storing a line end position;

line feed code detecting means for detecting line feed codes in a body of text;

character code counting means for counting a number of character codes from head of the body of text up to immediately before a first code detected by said line feed code detecting means or a number of character codes between two line feed codes detected by the line feed detecting means; and line feed code position shifting means for collectively executing processes using a special trigger to shift, when the number of character codes counted by said character code counting means and the line end position stored in said line end position storing means do not match, a position of a latest line feed code detected by said line feed code detecting means to immediately after the line end position.

28. A text editing system editing a body of text in such a way that a left end of each line is aligned and a number of characters of each line is within a prescribed number of characters, comprising:

line end position storing means for storing a line end position;

line feed code detecting means for detecting line feed codes in a body of text;

character code counting means for counting a number of character codes from head of the body of text up to immediately before a first code detected by said line feed code detecting means or a number of character codes between two line feed codes detected by the line feed detecting means; and line feed code position shifting means for shifting, when the number of character codes counted by said character code counting means and the line end position stored in said line end position storing means do not match, a position of a latest line feed code detected by said line feed code detecting means to immediately after the line end position, and when a character that may not be first in a line shifts to a head of a line, said line feed code position shifting means shifts the character to an end of a preceding line.

* * * * *